US009651699B2

United States Patent
Snow et al.

(10) Patent No.: US 9,651,699 B2
(45) Date of Patent: May 16, 2017

(54) METHODS FOR DETERMINING WELL LOG ATTRIBUTES FOR FORMATION CHARACTERIZATION

(71) Applicant: APACHE CORPORATION, Houston, TX (US)

(72) Inventors: Cameron A Snow, Houston, TX (US); James A Ruiz, Houston, TX (US)

(73) Assignee: APACHE CORPORATION, Houston, TX (US)

( * ) Notice: Subject to any disclaimer, the term of this patent is extended or adjusted under 35 U.S.C. 154(b) by 40 days.

(21) Appl. No.: 14/766,805

(22) PCT Filed: Feb. 13, 2014

(86) PCT No.: PCT/US2014/016293
§ 371 (c)(1),
(2) Date: Aug. 10, 2015

(87) PCT Pub. No.: WO2014/130342
PCT Pub. Date: Aug. 28, 2014

(65) Prior Publication Data
US 2015/0378042 A1    Dec. 31, 2015

Related U.S. Application Data

(60) Provisional application No. 61/766,722, filed on Feb. 20, 2013.

(51) Int. Cl.
*G01V 1/50*    (2006.01)
(52) U.S. Cl.
CPC ..................... *G01V 1/50* (2013.01)

(58) Field of Classification Search
CPC ........................................................ G01V 1/50
USPC ............................................. 367/26, 29, 35
See application file for complete search history.

(56) References Cited

U.S. PATENT DOCUMENTS

| | | | | |
|---|---|---|---|---|
| 6,324,477 B1* | 11/2001 | Bork | ........................ | G01V 1/30 702/17 |
| 6,384,905 B1* | 5/2002 | Barrows | ............... | G06T 7/2066 356/28 |
| 2002/0183930 A1* | 12/2002 | Plona | ........................ | G01V 1/50 702/6 |
| 2003/0198316 A1* | 10/2003 | Dewaele | ............... | A61B 6/505 378/54 |
| 2004/0081369 A1* | 4/2004 | Gindele | ................... | G06K 9/40 382/274 |
| 2004/0133350 A1* | 7/2004 | Veneruso | ................ | G01V 1/36 702/6 |
| 2005/0087367 A1* | 4/2005 | Hutchinson | ............. | E21B 44/00 175/45 |
| 2006/0155475 A1* | 7/2006 | Yin | ........................ | G01V 1/28 702/14 |

(Continued)

*Primary Examiner* — Daniel L Murphy
(74) *Attorney, Agent, or Firm* — Richard A. Fagin; Adenike Adebiyi

(57) ABSTRACT

A method for characterizing subsurface formations penetrated by a wellbore includes accepting as input to a computer measurements of a physical parameter of the formations made over a selected axial interval of the wellbore. At least one attribute of the measurements is determined from a change in the measurements over the selected axial interval. At least one characteristic of the formations in the selected axial interval using the at least one attribute.

25 Claims, 27 Drawing Sheets

(56) References Cited

U.S. PATENT DOCUMENTS

| | | | |
|---|---|---|---|
| 2009/0194332 A1* | 8/2009 | Pastusek | E21B 21/08 175/40 |
| 2009/0240436 A1* | 9/2009 | Heigl | G01V 1/48 702/11 |
| 2010/0206039 A1* | 8/2010 | Kates | G08B 21/0236 73/1.01 |
| 2011/0232902 A1* | 9/2011 | Chu | G01V 1/30 166/250.01 |
| 2012/0008676 A1* | 1/2012 | Lee | H04N 19/137 375/240.02 |
| 2012/0132823 A1* | 5/2012 | Menge | G01T 3/06 250/390.11 |
| 2012/0245863 A1* | 9/2012 | Rick | G01P 5/241 702/50 |

* cited by examiner

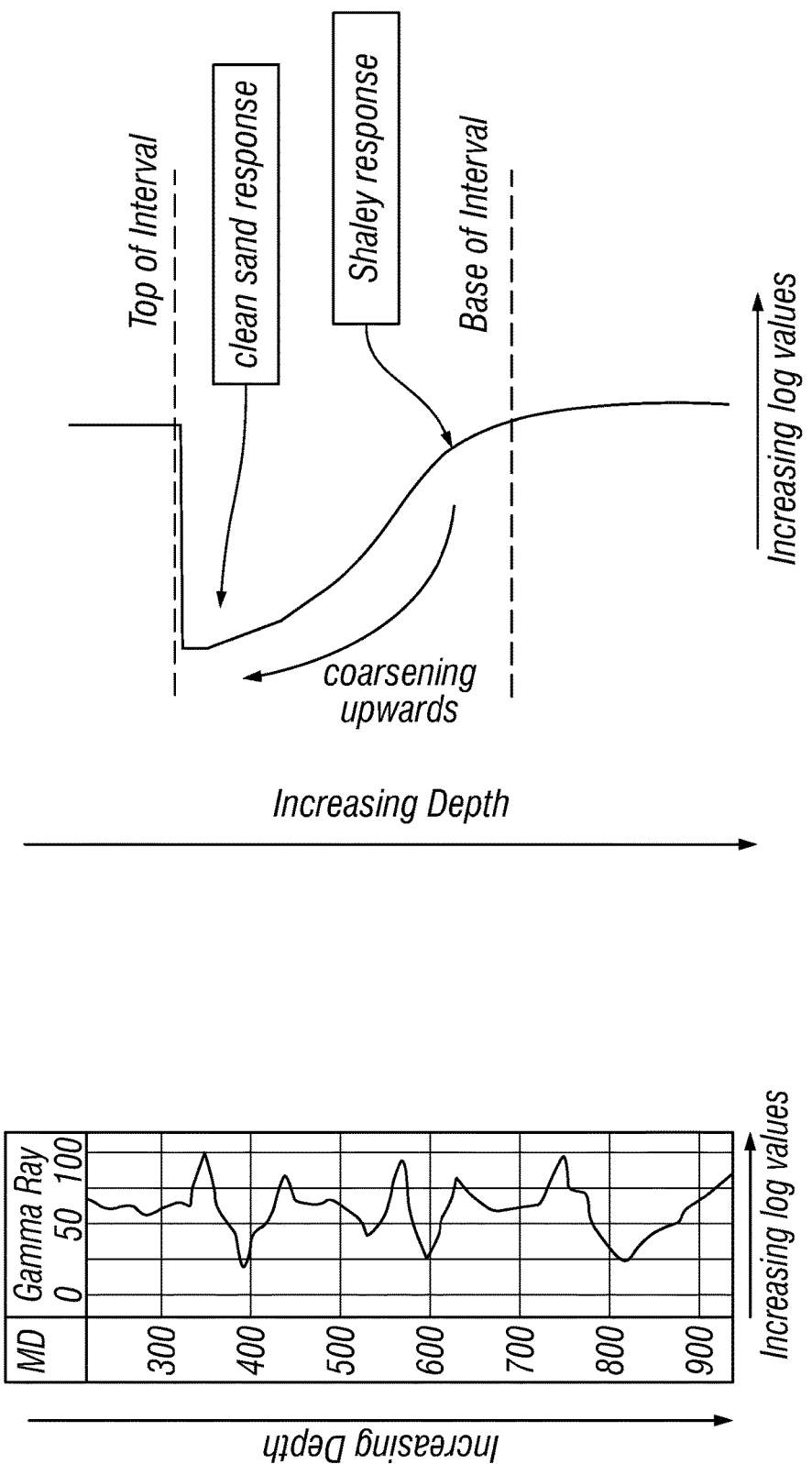

METHODS FOR DETERMINING WELL LOG ATTRIBUTES FOR FORMATION CHARACTERIZATION

BACKGROUND

This disclosure relates generally to the field of well log data. More particularly, the disclosure relates to methods for determining attributes of well log data to assist in determining characteristics of subsurface formations.

Well logs are measurements of physical parameters of the subsurface formations that are penetrated by a wellbore, with respect to depth (axial position along the wellbore, which may or may not be converted into "true vertical depth" or linear distance from the surface to a particular position in the wellbore). The measurements may include, for example and without limitation, acoustic data, resistivity data, radiation source activated nuclear data, temperature data, and naturally occurring radioactivity data. Data from well logging is typically displayed in a graphical form with the measured parameter displayed on the horizontal axis, and the depth at which the measurement was made on the vertical axis, as shown in FIG. 1. These data are used to make inferences about the rock and fluid properties of subsurface formations, such as rock mineral composition, clay volume, porosity, permeability, and fluid saturation, to correlate geological formations and properties between wellbores, and to make interpretations of depositional environment and lithologic facies.

Interpretation of the depositional environment and lithological facies is typically performed by making qualitative descriptions of certain measured parameters, and by describing the general shapes of the well log data when plotted with respect to depth. For example, a well log such as the one shown in FIG. 2 is often described as having a "coarsening upwards" pattern, inasmuch as the measurement of the formation's natural radioactivity (corresponding to clay mineral content) decreases with decreasing depth. Furthermore, the formation depicted in FIG. 2 might be described as "clean" (i.e., substantially free of clay minerals) at the uppermost levels where the values for measured radioactivity are low and as "shaly" where the measured values are higher. These types of descriptions are qualitative and are performed manually by a skilled interpreter using prior knowledge of the art of geological and petrophysical interpretation.

The well log data observed by an interpreter are typically classified by the well log curve shape. Examples of some commonly classified log shape descriptions are shown in FIG. 3 at 90 through 97. These types of interpretations are typically performed manually, as stated above, and are based on the interpreter's subjective opinion. There are numerous shortcomings associated such interpretive techniques, including: difficulties associated with consistent interpretations among interpreters; the inability to rapidly make interpretations using computer algorithms; the inability to quantify the differences between well logs within a classification or among various classifications; and the requirement that the interpreter be highly skilled in the art of well log interpretation.

There exists a need for more reliable, consistent methods for characterizing formation characteristics based on changes in well log data values with respect to depth in a wellbore.

SUMMARY

A method according to one aspect for characterizing subsurface formations penetrated by a wellbore includes accepting as input to a computer measurements of a physical parameter of the formations made over a selected axial interval of the wellbore. At least one attribute of the measurements is determined from a change in the measurements over the selected axial interval. At least one characteristic of the formations in the selected axial interval using the at least one attribute.

Other aspects and advantages of the present disclosure will be apparent from the description and claims that follow.

BRIEF DESCRIPTION OF THE DRAWINGS

FIG. 1 shows an example of a well log showing the measurement of a geological formation's naturally occurring radioactivity (gamma ray) versus depth.

FIG. 2 shows an example of a well log manually interpreted to be coarsening upwards in a specified interval, with a formation described as "clean" at the shallowest depths in the interval and "shaley" at greater depths in the interval.

DETAILED DESCRIPTION

Figure 4:
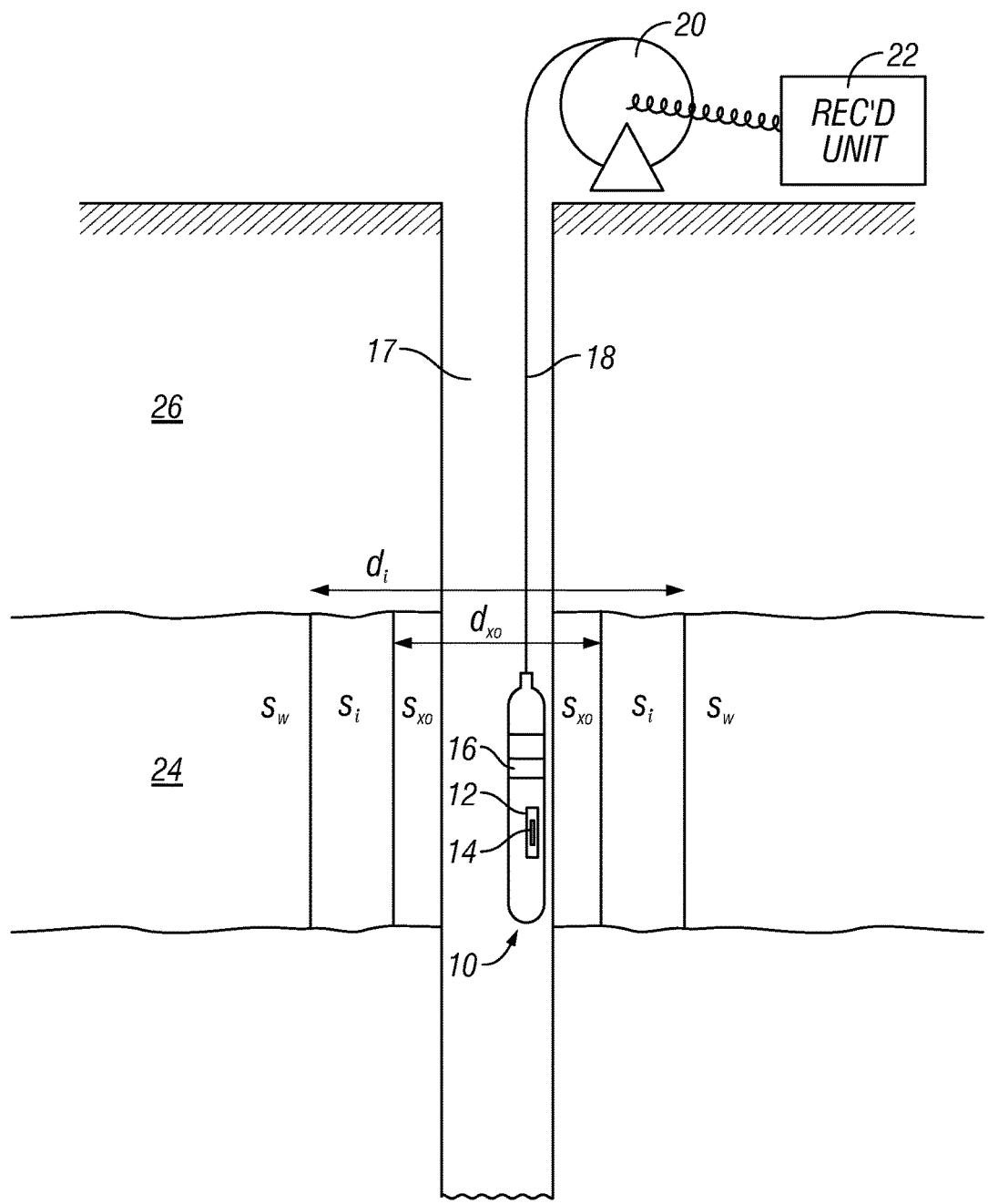
FIG. 4 shows an example of acquiring well log data using "wireline" conveyed well logging tools.

FIG. 4 shows an example "wireline" well logging instrument 10 disposed in a wellbore 17 drilled through subsurface rock formations 26, 24. The instrument 10 is attached to one end of an armored electrical cable ("wireline") 18. The cable 18 may be extended into the wellbore 17 and withdrawn therefrom by a spooling device such as a winch 20 of types well known in the art. The cable 18 includes one or more insulated electrical conductors and may include one or more optical fibers to communicate signals between the instrument 10 and a recording unit 22 disposed at the Earth's surface. The recording unit 22 may include a computer (not shown separately) having a screen or printer type data display, input controls and a data recording device for storage of signals (e.g., NMR, gamma radiation, density, acoustic, neutron porosity, resistivity, etc. measurements) communicated from the well logging instrument 10, as well as for storing or displaying calculated results made from the measurements made by the instrument 10.

The well logging instrument 10 includes one or more sensors 12 for making well log measurements that may be processed according to various examples in the present disclosure.

Some formations, for example the one illustrated at 24 in FIG. 4 may be permeable and/or contain movable hydrocarbon in the pore spaces thereof. Proximate the wall of the wellbore 17, a portion of the formation 24 may be subjected to sufficient infiltration of the liquid phase of a fluid ("drilling mud"), called "mud filtrate", used to drill the wellbore 17, that substantially all of the mobile connate fluids in the pore spaces of the formation 24 are displaced by the mud filtrate. Depending on, for example, the fractional volume of pore space ("porosity") of the formation 24, and the filtrate characteristics of the drilling mud, the mud filtrate will fully displace all the mobile connate fluids to a depth represented by $d_{xo}$ in FIG. 4. The foregoing is referred to as the diameter of the "flushed zone." Partial displacement of connate fluid is shown extending to a diameter represented by $d_i$, which is used to represent the diameter of the "invaded zone." At a certain lateral depth in the formation 24, beyond the diameter of the invaded zone, connate fluid is substantially undisturbed. A quantity of interest in determining possible fluid production in from the formation is the fractional volume of the pore space that is occupied by water (and its complement assumed to be occupied by hydrocarbons). In the uninvaded zone, such fractional volume, called "saturation", is represented by Sw. Invaded zone and flushed zone water saturations are represented, respectively, by Si and Sxo.

The example instrument shown in FIG. 4 is only for purposes of explaining the source of measurements that may be used with a method according to the present disclosure and is not intended to limit the configurations of well logging instrument that may be used to provide measurements for the method of the present disclosure. Further, reference to portions of formations that contain hydrocarbon are only for purposes of illustrating general principles of well logging.

Figure 5:
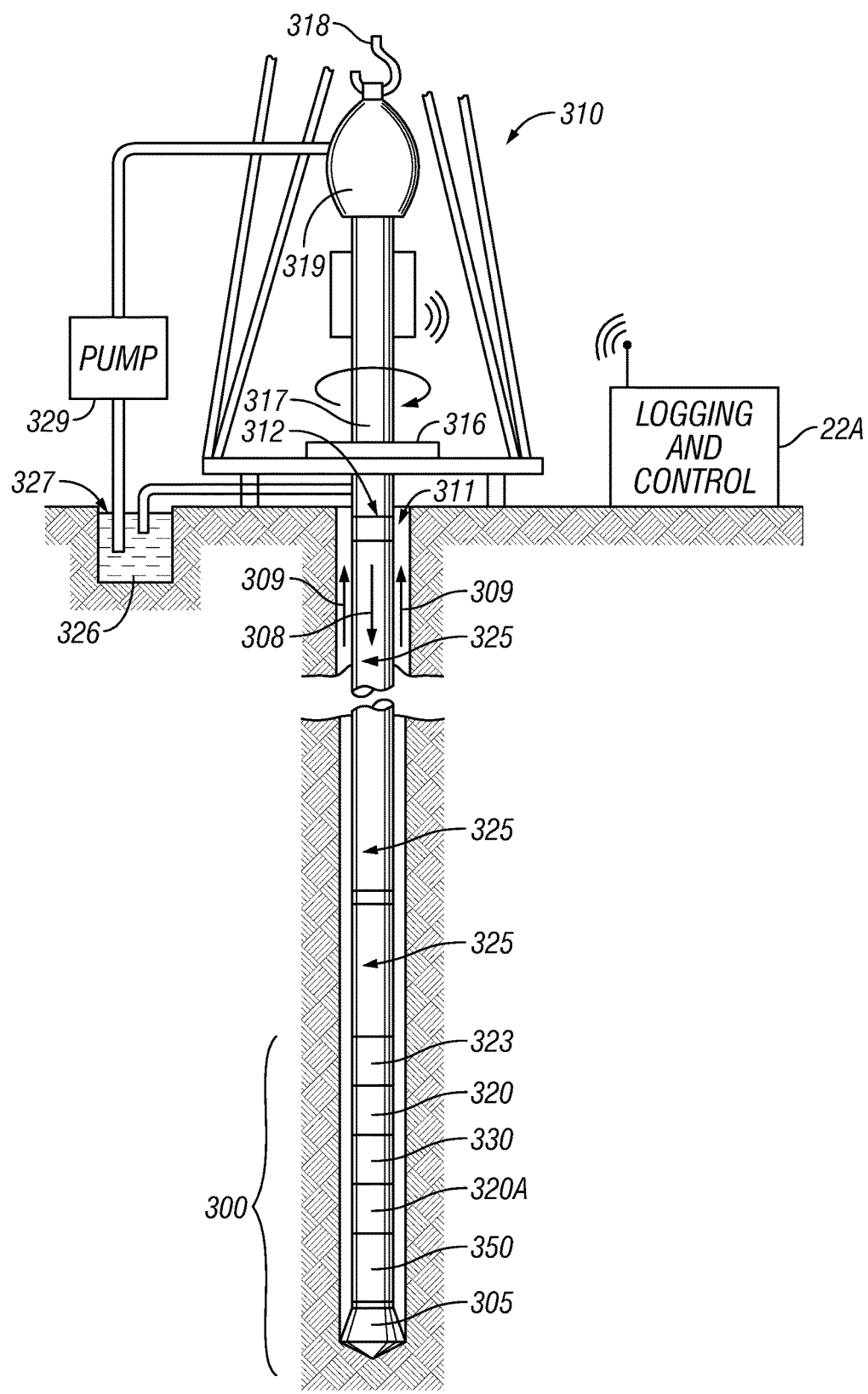
FIG. 5 shows an example of acquiring well log data using logging while drilling ("LWD") well logging tools.

FIG. 5 illustrates a well site system in which well logging instruments can be conveyed using a drill string or other pipe string for measurement during the drilling of the wellbore, or during other pipe string operations associated with the construction of a wellbore such as circulating, washing, reaming and "tripping." The well site can be onshore or offshore. In the example system of FIG. 5, a wellbore 311 is drilled through subsurface formations by rotary drilling in a manner that is well known in the art. Other examples of well logging instruments applicable to the present discipline can be used in connection with directional drilling apparatus and methods. Accordingly, the configuration shown in FIG. 5 is only intended to illustrate a possible source of well log measurements and is not intended to limit the scope of the present invention.

A drill string 312 is suspended within the wellbore 311 and includes a bottom hole assembly ("BHA") 300 proximate the lower end thereof. The BHA 300 includes a drill bit 305 at its lower end. The surface portion of the well site system includes a platform and derrick assembly 310 positioned over the wellbore 311, the assembly 310 including a rotary table 316, kelly 317, hook 318 and rotary swivel 319. The drill string 312 is rotated by the rotary table 316, which is itself operated by well-known means not shown in the drawing. The rotary table 316 engages the kelly 317 at the upper end of the drill string 312. The drill string 312 is suspended from the hook 318. The hook 318 is attached to a traveling block (also not shown), through the kelly 317 and the rotary swivel 319 which permits rotation of the drill string 312 relative to the hook 318. As is well known, a top drive system (not shown) could alternatively be used instead of the kelly 317 and rotary table 316 to rotate the drill string 312 from the surface. The drill string 312 may be assembled from a plurality of segments 325 of pipe and/or collars threadedly joined end to end.

In the present example, the surface system further includes drilling fluid ("mud") 326 stored in a tank or pit 327 formed at the well site. A pump 329 delivers the drilling fluid 326 to the interior of the drill string 312 via a port in the swivel 319, causing the drilling fluid 326 to flow downwardly through the drill string 312 as indicated by the directional arrow 308. The drilling fluid 326 exits the drill string 312 via water courses, or nozzles ("jets") in the drill bit 305, and then circulates upwardly through the annulus region between the outside of the drill string and the wall of the borehole, as indicated by the directional arrows 309. In this well known manner, the drilling fluid 326 lubricates the drill bit 305 and carries formation cuttings up to the surface, whereupon the drilling fluid 326 is cleaned and returned to the pit 327 for recirculation.

The bottom hole assembly 300 of the illustrated example can include a logging-while-drilling (LWD) module 320, a measuring-while-drilling (MWD) module 330, a steerable directional drilling system such as a rotary steerable system and/or an hydraulically operated motor such as a steerable motor, and the drill bit 305.

The LWD module 320 is housed in a special type of drill collar, as is known in the art, and can contain one or a plurality of known types of well logging instruments. It will also be understood that more than one LWD and/or MWD module can be used, e.g. as represented at 320A. (References, throughout, to a module at the position of LWD module 320 can alternatively mean a module at the position of MWD module 320A as well.) The LWD module 320A typically includes capabilities for measuring, processing, and storing information, as well as for communicating with the surface equipment. In the present embodiment, the LWD module 320 includes various forms of formation parameter measuring instruments, e.g., those capable of making measurements of formation parameters such as those explained above with reference to FIG. 4.

The MWD module 330 is also housed in a special type of drill collar, as is known in the art, and can contain one or more devices for measuring characteristics of the drill string and drill bit. The MWD module 330 further includes an apparatus (not shown) for generating electrical power for the downhole portion of the well site system. Such apparatus typically includes a turbine generator powered by the flow of the drilling fluid 326, it being understood that other power and/or battery systems may be used while remaining within the scope of the present invention. In the present example, the MWD 330 module can include, without limitation, one or more of the following types of measuring devices: a weight-on-bit measuring device, a torque measuring device, a vibration measuring device, a shock measuring device, a stick slip measuring device, a direction measuring device, and an inclination measuring device. A recording unit 22A may be disposed at the surface and may include data acquisition, recording, input, control and display devices similar to those of the recording unit shown at 22 in FIG. 5.

The foregoing examples of wireline and drill string conveyance of a well logging instrument are not to be construed as a limitation on the types of conveyance that may be used for the well logging instrument. Any other conveyance known in the art may be used, including without limitation, slickline (solid wire cable), coiled tubing, well tractor and production tubing.

In accordance with the present disclosure, several attributes of any one or more of the well log measurements may be defined using multiple methods. The term "attributes" as it is used herein may be defined as a relationship between measured values of a well log or calculated parameters from such measurements with respect to axial position (depth) in the wellbore. The relationship may be defined as a mathematical function or other form. For clarity the following are assumed for all attributes, methods, and associated figures, but only for clarity of illustration: log measurement values increase toward the right-hand side of the horizontal axis and depth (axial position along the wellbore) increases along the vertical axis towards the bottom of the illustration; calculated attributes are specific to the specified interval and methods are applied only to the data values within the specified interval (with the specified interval defined as the zone between the labels "Top of Interval" and "Base of Interval"); and threshold values are user-defined and can either be calculated by analyzing the distribution of the measurements or assigned by the user. Following are examples of attributes that may be used in interpretation of well log data acquired, for example, as explained with reference to FIGS. 4 and 5.

Prior to determining attributes, one or more axial (depth) intervals of well log data may be determined. Following are two example automatic techniques for determining axial intervals of the well log for further processing that may be implemented in a computer system (explained further below).

1. Negative Cycle Length Method: This method for axial interval determination evaluates the length of an interval of well log data that exceeds a threshold value, and places a marker at the top and base (shallowest and deepest depth) of each of one or more "cycles" (variations in log measurement value) that is greater than a predetermined cutoff value for cycle length, as illustrated in FIG. 3A at 1A and 1C. The foregoing interval determination method may include the following steps:

a. Setting a threshold value. The threshold value can be determined by either using a value of the well log measurements which the user deems as appropriate based on a priori knowledge of the distribution of measurements within the well log, or by using an appropriately high and/or low quantile of the number of occurrences of specific values of the measurements, as illustrated in FIG. 3A in the histogram 1B.

b. Placing a marker at the depth of the first and last intersection of the threshold value and well log measurement value. (Markers $M_1$ and $M_{12}$ in FIG. 3A).

c. Placing a marker at all intersections of the threshold value and well log measurement values (Markers $M_2$-$M_{11}$ in FIG. 3A at 1A.).

d. Evaluating the length of all of the intervals e.g., $C_1$ through $C_5$ in the graph at 1A in FIG. 3A, where the well log data values exceed the threshold value set for the well, as measured between the markers set in the previous steps.

e. Determining a cutoff value for the length of $C_1$ through $C_n$ that will be used for subdivision.

f. Individually comparing the length of the all the intervals ($C_1$, $C_2$, . . . , $C_n$) to the cutoff value for the length of $C_1$ through $C_n$.

g. Eliminating the markers that define the tops and bases of axial intervals where the length of the interval $C_1$ is less than the cutoff value for the length of $C_1$ through $C_n$, except those markers delineating the first and last intersection of the threshold value and well log data. (Markers $M_2$, $M_3$, $M_4$, $M_5$, $M_6$, and $M_7$ in FIG. 3A). This may be expressed as: $C_1$, $C_2$, $C_3$<Cutoff<$C_4$, $C_5$.

h. The remaining markers may then be used in the subdivision of the well log into intervals (Markers $M_1$, $M_8$, $M_9$, $M_{10}$, $M_{11}$, and $M_{12}$ in FIG. 3A at graph 1C).

The foregoing axial (depth) interval selection method may be advantageous in that can create a consistent and useful subdivision of the well log data in the depth domain, it can be fully automated and it can be scaled using a threshold method to provide a range of subdivisions. Furthermore, the selected method can be jointly applied with other methods given to provide useful solutions even if all intervals C are less than the cutoff criteria.

2. Double Threshold Method: This method subdivides well log measurements based on the intersection of two threshold values and the well log measurement values. This method is particularly advantageous when subdividing measurements for the purpose of analyzing well log measurements that are consistently and continuously low value, as illustrated in FIG. 3B at graphs 2A and 2C. Application of the present method may include the following:

a. Setting a threshold values: The threshold value may be determined by either using values of the measurements which the user deems as appropriate based on a priori knowledge of the distribution of measurements within the well log, or by using an appropriately high quantile of the data for $T_1$ and an appropriately low quantile of the data for $T_2$ as illustrated in FIG. 3B in the histogram at 2B.

b. Placing a marker M at the depth where the values for threshold $T_1$ and the well log measurement values intersect, as shown in FIG. 3B in the graph at A (Markers $M_1$-$M_9$, $M_{12}$, $M_{13}$, and $M_{16}$ as shown in FIG. 3B in the graph at 2A).

c. Placing a marker M at the depth where the values for threshold $T_2$ and the well log values intersect, as shown in FIG. 3B (Markers $M_{10}$, $M_{11}$, $M_{14}$, and $M_{15}$ as shown in FIG. 3B in the graph at 2C).

d. Evaluating the length of all of the intervals C that lay between adjacent markers that mark the intersection with different threshold values (between Markers $M_9$ and $M_{10}$, $M_{13}$, and $M_{14}$ and and $M_{16}$ as shown in FIG. 3B in the graph at 2C).

e. Eliminating markers that intersect threshold $T_1$ where one of the adjacent markers is not marking the intersection of threshold $T_2$, or where the marker is either the uppermost or lowermost marker present. Eliminating the markers that mark the intersection of threshold $T_2$, unless the marker is either the uppermost or lowermost marker present (the remaining Markers will be $M_1$, $M_8$, $M_9$, $M_{12}$, $M_{13}$, and $M_{16}$ in FIG. 3B in the graph at 2C). The remaining markers are then used in the subdivision of the well log into intervals.

The foregoing method may be advantageously applied in combination with the Negative Cycle Length Method by either using all of the markers resulting from both analyses, or only markers that are present in both (if a consistent value was used for the higher threshold value in each analysis).

It may also be possible to have a user manually select intervals based on observation of various well log measurements.

Having explained example techniques for determining axial intervals of well log measurements for analysis, following are various attributes of well log measurements that may be determined and their application to evaluation of subsurface formations.

Figure 6:
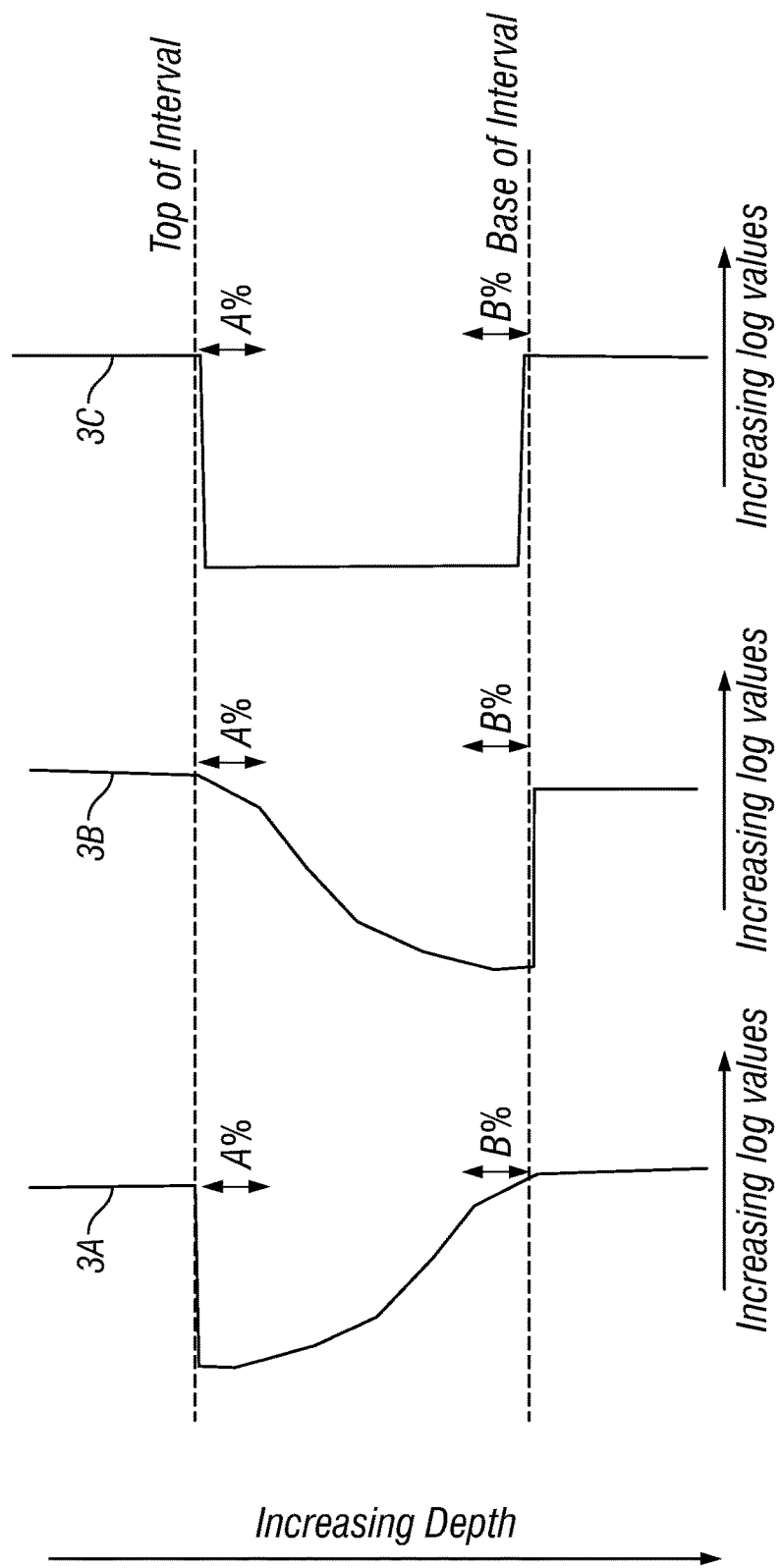
FIG. 6 shows an illustration of the Symmetrical Ratio Attribute. (A) In a coarsening upward sequence the ratio of the uppermost A percent to the lowermost B percent will typically yield a value less than one. (B) In a fining upward sequence the ratio of the uppermost A percent to the lowermost B percent will typically yield a value greater than one. (C) In a block sequence the ratio of the uppermost A percent to the lowermost B percent will yield a value approximately equal to one.
Figure 7:
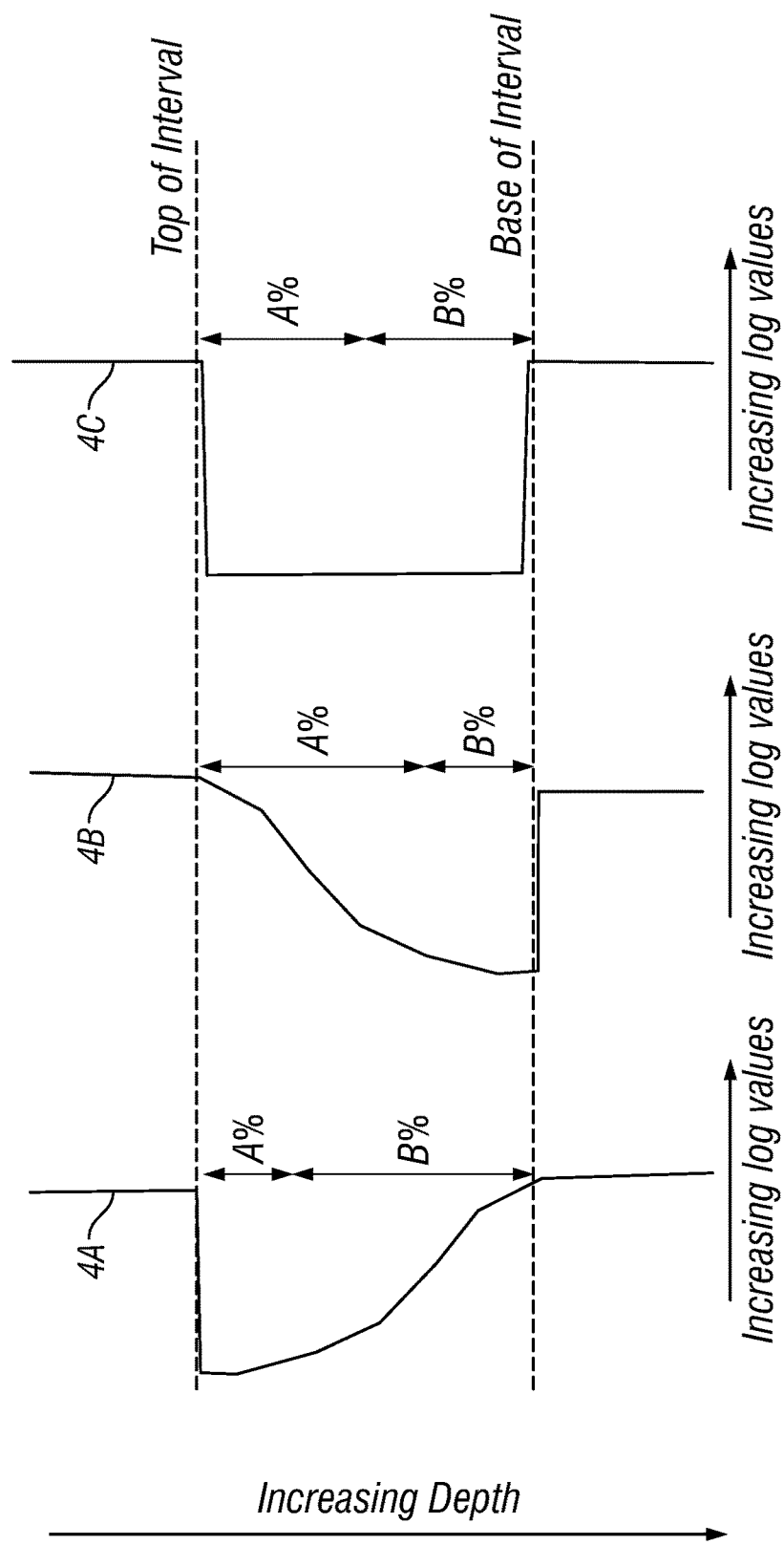
FIG. 7 shows an illustration of the Asymmetrical Ratio Attribute. (A) In a coarsening upward sequence the ratio of the uppermost A percent to the lowermost B percent will increase with increasing lengths of interval A. (B) In a fining upward sequence the ratio of the uppermost A percent to the lowermost B percent will decrease with increasing lengths of interval A. (C) in a block sequence the ratio of the uppermost A percent to the lowermost B percent will remain relatively constant with varying lengths of intervals A and B.

Symmetrical Ratio Attribute: This attribute evaluates the ratio of the average of the well log values between the uppermost A percent and lowermost B percent of a specified log interval, where A=B, as shown in FIG. 6 in the graphs at 3A, 3B and 3C. This method is advantageous for differentiating between fining upward patterns, coarsening upward patterns, and other log shape patterns that are present in FIG. 3 at 90-97. Furthermore, the attribute may be calculated for only data that are above or below a predetermined threshold value, which can be advantageous for further distinguishing between blocky log shape patterns and irregular/chaotic log shape patterns. The present attribute may be particularly useful when it is desirable to only analyze "clean" (those relatively free of clay minerals or shale) reservoirs Asymmetrical Ratio Attribute: This attribute evaluates the ratio of the average of the well log values between the uppermost A percent and lowermost B percent of a specified log interval, where A+B=1, as shown in FIG. 7 in the graphs at 4A, 4B and 4C. This method is useful for differentiating between fining upward patterns, coarsening upward patterns, and other log shape patterns that are present in FIG. 3 at 90-97. Furthermore, the present attribute can be calculated only for data that are above or below a predetermined threshold value, which can be advantageous for further distinguishing between blocky log shape patterns and irregular/chaotic log shape patterns. The present example attribute may be particularly useful when it is desirable to only analyze "clean" reservoirs as defined above. An additional advantage of the present example attribute is when the attribute is calculated three or more times with interval lengths where A>B, A=B, and A<B; then blocky and bow-shaped log patterns may also be identified.

Figure 8:
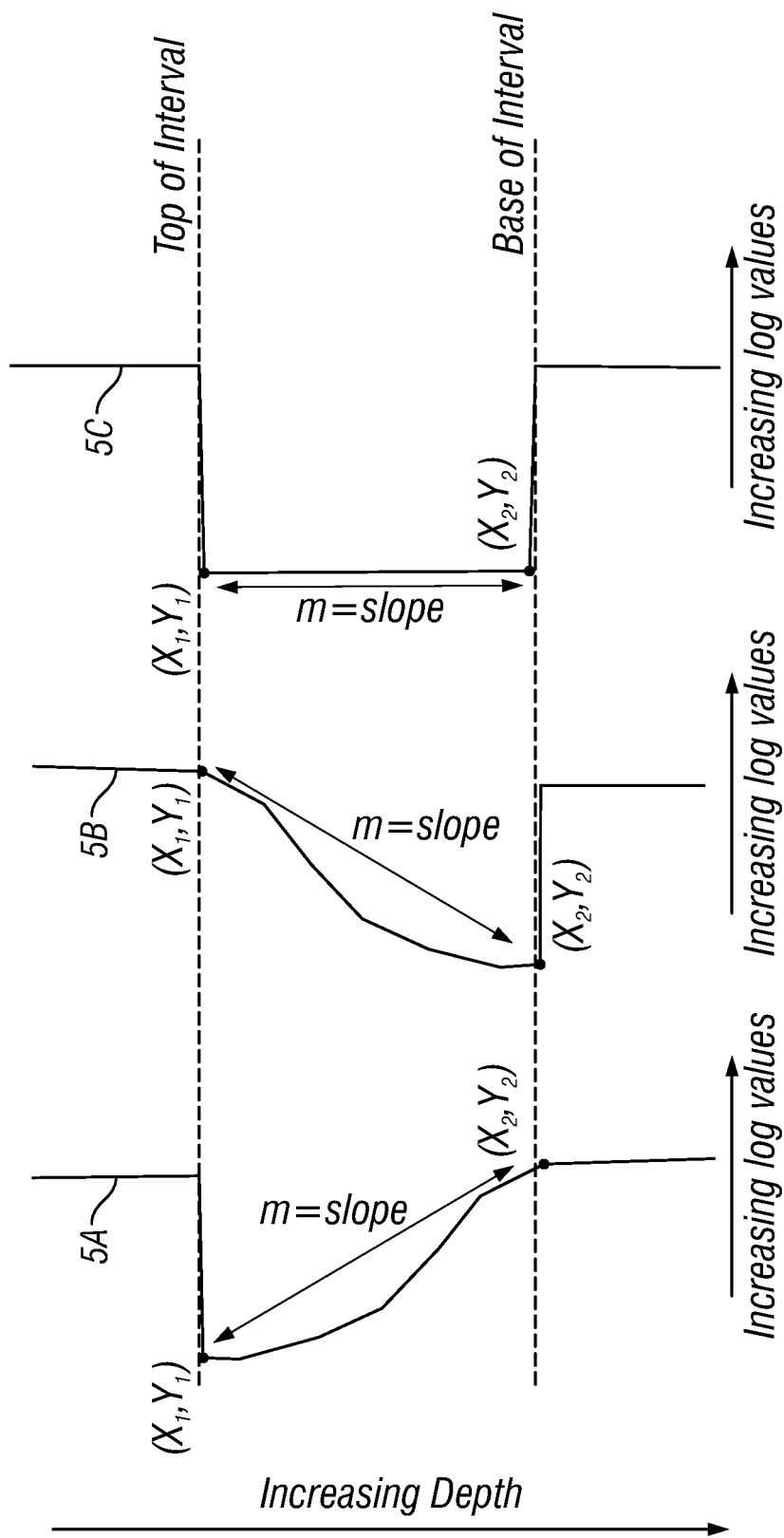
FIG. 8 shows an illustration of the Instantaneous Slope Attribute. (A) In a coarsening upward sequence the slope will be a low positive number. (B) In a fining upward sequence the slope will be a low negative number. (C) In a blocky sequence the slope can be either a high positive or high negative number that can approach positive or negative infinity.

Instantaneous Slope Attribute: This attribute evaluates the slope between the uppermost and lowermost points in a specified well log interval, as shown in FIG. 8 in the graphs at 5A, 5B and 5C, where the slope m, is defined as:

$$m = \frac{(Y_1 - Y_2)}{(X_1 - X_2)}$$

Figure 3:
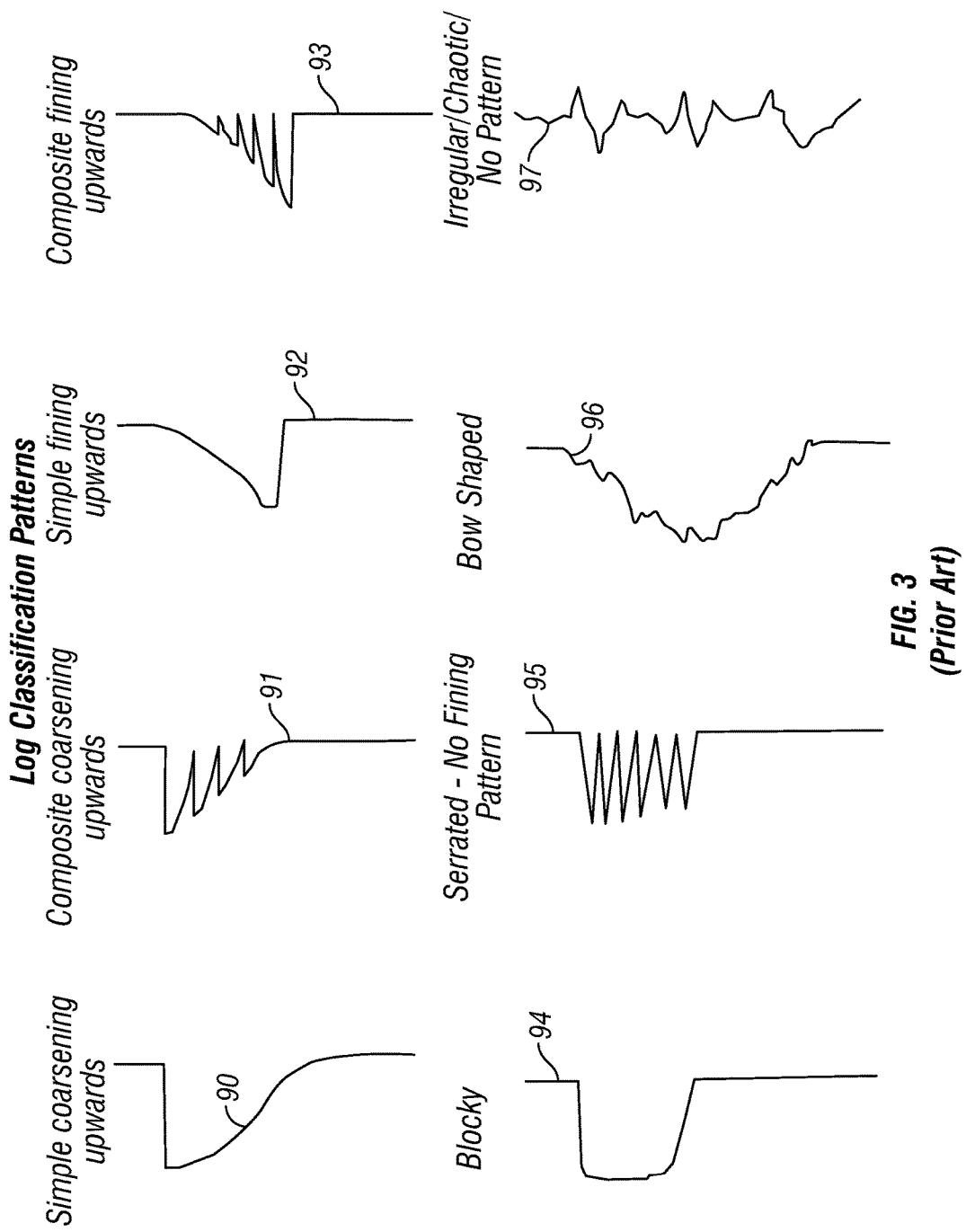
FIG. 3 shows an example of a classification scheme illustrating the log patterns that a skilled interpreter would attempt to identify in a well log interval.
Figure 3A:
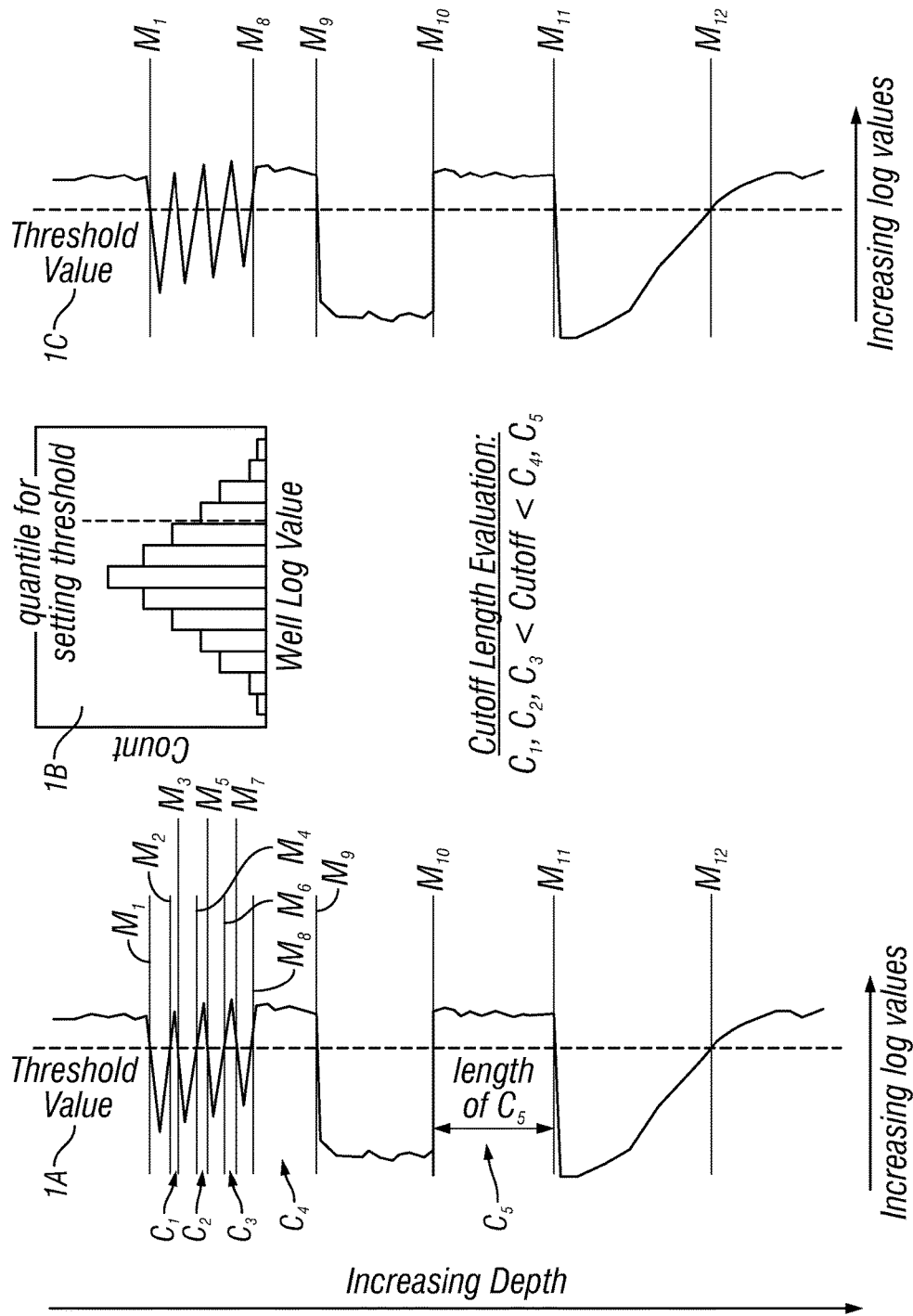
FIG. 3A illustrates an example technique for automatically selecting axial (depth) intervals from a well log.
Figure 3B:
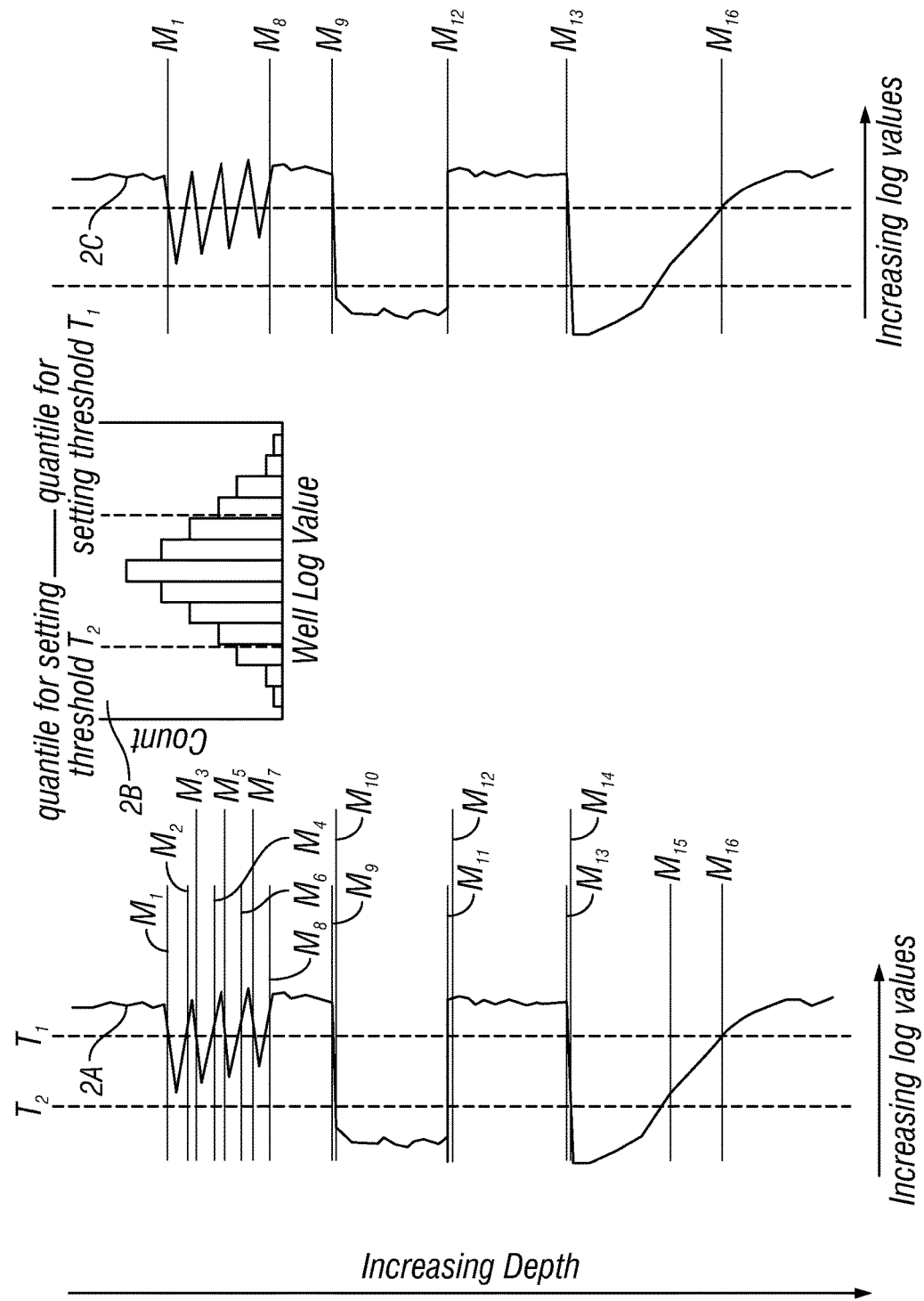
FIG. 3B illustrates another example technique for automatically selecting axial intervals from a well log.

This attribute may be advantageous for differentiating between fining upward patterns, coarsening upward patterns, and other log shape patterns that are present in FIG. 3 at 90-97. Furthermore, the present attribute can be calculated for only well log measurements that satisfy a threshold value (i.e., the uppermost and lowermost points that satisfy the threshold criteria), which may offer the advantage of yielding a more robust solution in instances where the top and base of the user specified interval was poorly chosen or when it is desirable to only evaluate the attribute in "clean" reservoirs.

Figure 9:
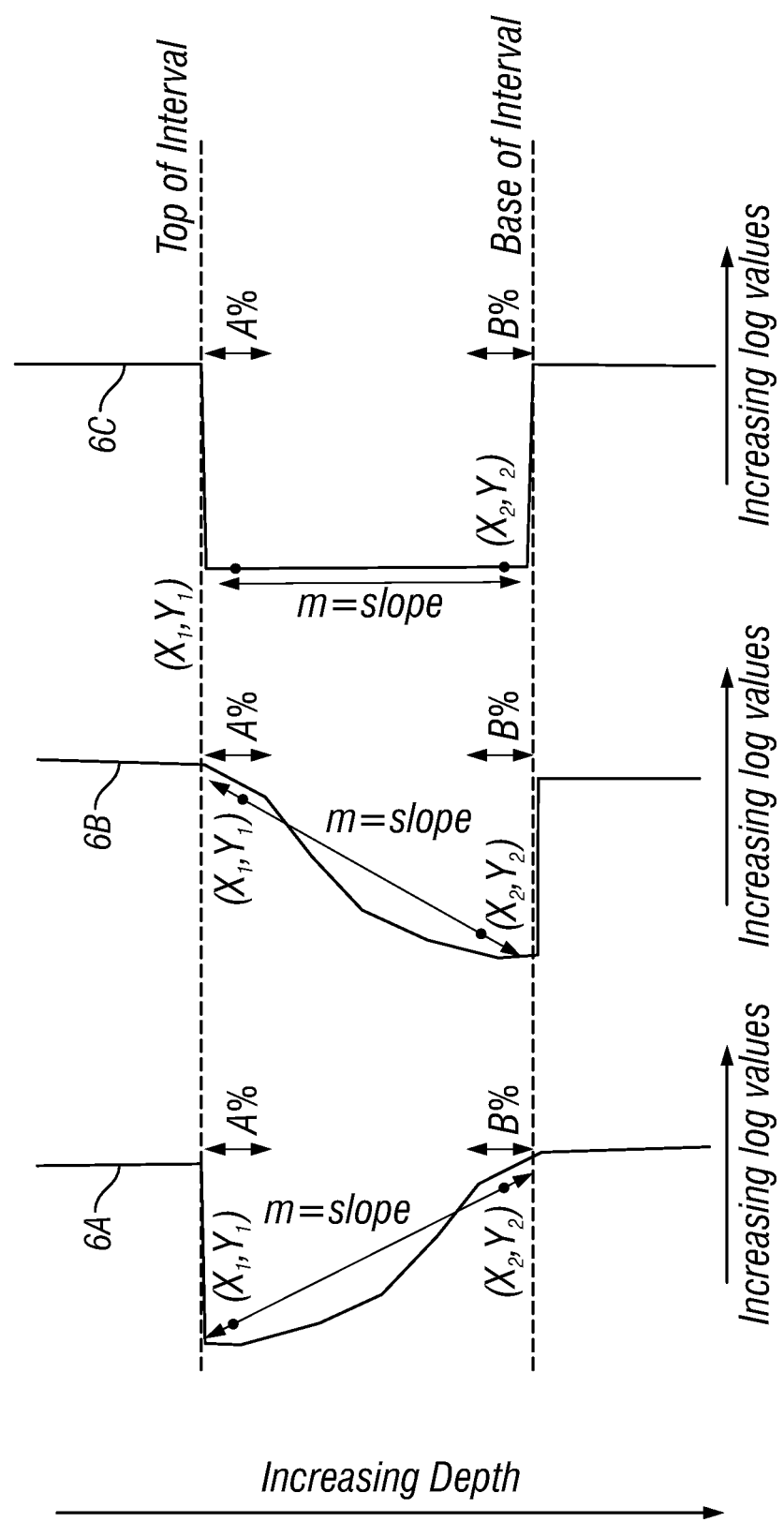
FIG. 9 shows an illustration of the Symmetrical Ratio Slope Attribute. (A) In a coarsening upward sequence the slope will be a low positive number. (B) In a fining upward sequence the slope will be a low negative number. (C) In a blocky sequence the slope can be either a high positive or high negative number that can approach positive or negative infinity.

Symmetrical Ratio Slope Attribute: This attribute evaluates the slope between the average (mean) of the well log values for the uppermost A percent and lowermost B percent of a specified log interval, where A=B, as shown in FIG. 9 in the graphs at 6A, 6B and 6C, where the slope m is defined as:

$$m = \frac{(Y_1 - Y_2)}{(X_1 - X_2)}$$

and where $Y_1$ is the average of the Y values for interval A, $X_1$ is the average of the X values for interval A, $Y_2$ is the average of the Y values for interval B, and $X_2$ is the average of the X values for interval B. This method is advantageous for differentiating between fining upward patterns, coarsening upward patterns, and other log shape patterns that are present in FIG. 3 at 90-97. X values represent the well log parameter measurement values and Y values represent the depth values. Furthermore, the present attribute may be calculated only for well log measurements that satisfy a threshold value, which may offer the advantage of yielding a more robust solution in instances where the top and base of the user specified interval was poorly chosen or when it is desirable to only analyze "clean" reservoirs. An additional advantage to this attribute may be offered when the evaluation is applied three or more times with interval lengths where A>B, A=B, and A<B, then blocky and bow-shaped log patterns may also be identified.

Figure 10:
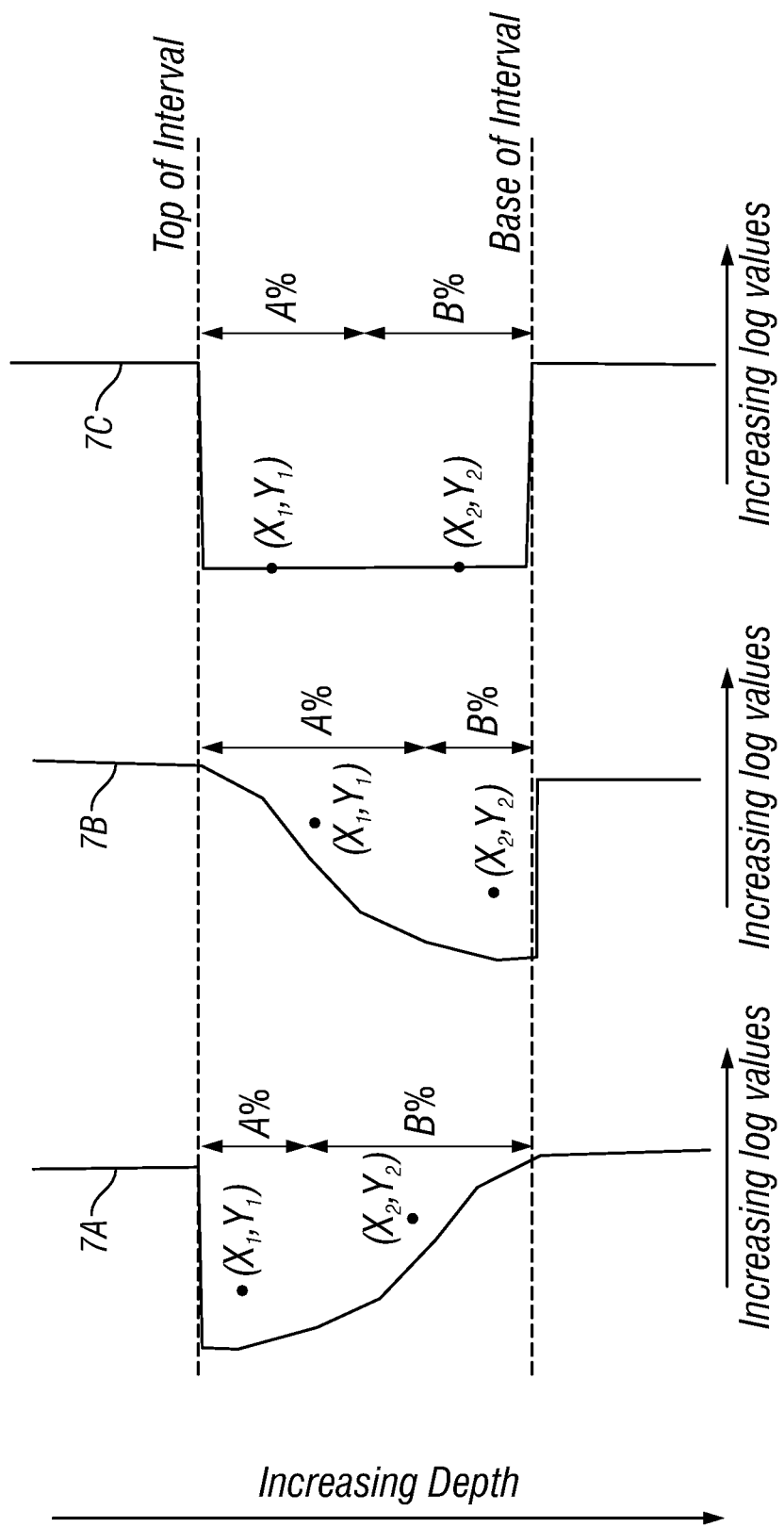
FIG. 10 shows an illustration of the Asymmetrical Ratio Slope Attribute. (A) In a coarsening upward sequence the slope will increase with increasing lengths of interval A. (B) In a fining upward sequence the slope will decrease with increasing lengths of interval A. (C) In a blocky sequence the slope will remain relatively constant with varying lengths of intervals A and B.

Asymmetrical Ratio Slope Attribute: This attribute evaluates the slope between the average (mean) of the well log values for the uppermost A percent and lowermost B percent of a specified log interval, where A+B=1, as shown in FIG. 10 in the graphs at 7A, 7B, 7C, where the slope m is defined as:

$$m = \frac{(Y_1 - Y_2)}{(X_1 - X_2)}$$

and where $Y_1$ is the average of the Y values for interval A, $X_1$ is the average of the X values for interval A, $Y_2$ is the average of the Y values for interval B, and $X_2$ is the average of the X values for interval B. This method is advantageous for differentiating between fining upward patterns, coarsening upward patterns, and other log shape patterns that are present in FIG. 3 at 90-97. X and Y values are as explained above with reference to the Symmetrical Slope method. Furthermore, the present attribute can be calculated for only data that satisfy a threshold value, which offers the advantage of yielding a more robust solution in instances where the top and base of the user specified interval was poorly chosen or when it is desirable to only evaluate the method in "clean" reservoirs.

Figure 11:
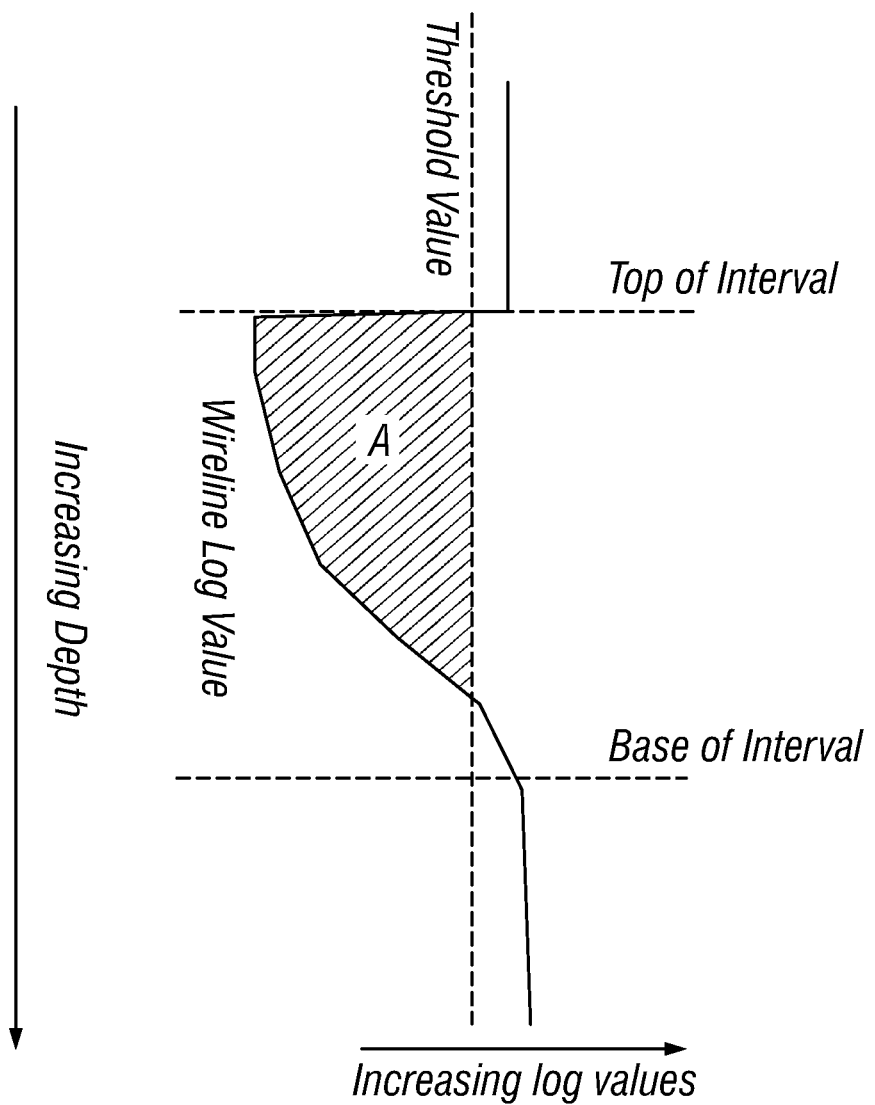
FIG. 11 shows an illustration of the Area Under the Curve Attribute. The Area A is calculated by integrating between a threshold value and the well log value.

Area Under the Curve Attribute: This attribute evaluates the area A by taking the integral between the well log value and a threshold value for a specified interval, as illustrated in FIG. 11. This method may be advantageous for determining if a clean reservoir is present and for evaluating the percentage of an interval that is clean reservoir. that can be classified as a "clean" reservoir package. Another possible advantage of this attribute is for determining if the specified interval is suitable for classification using attribute determination methods that use a threshold value.

Figure 12:
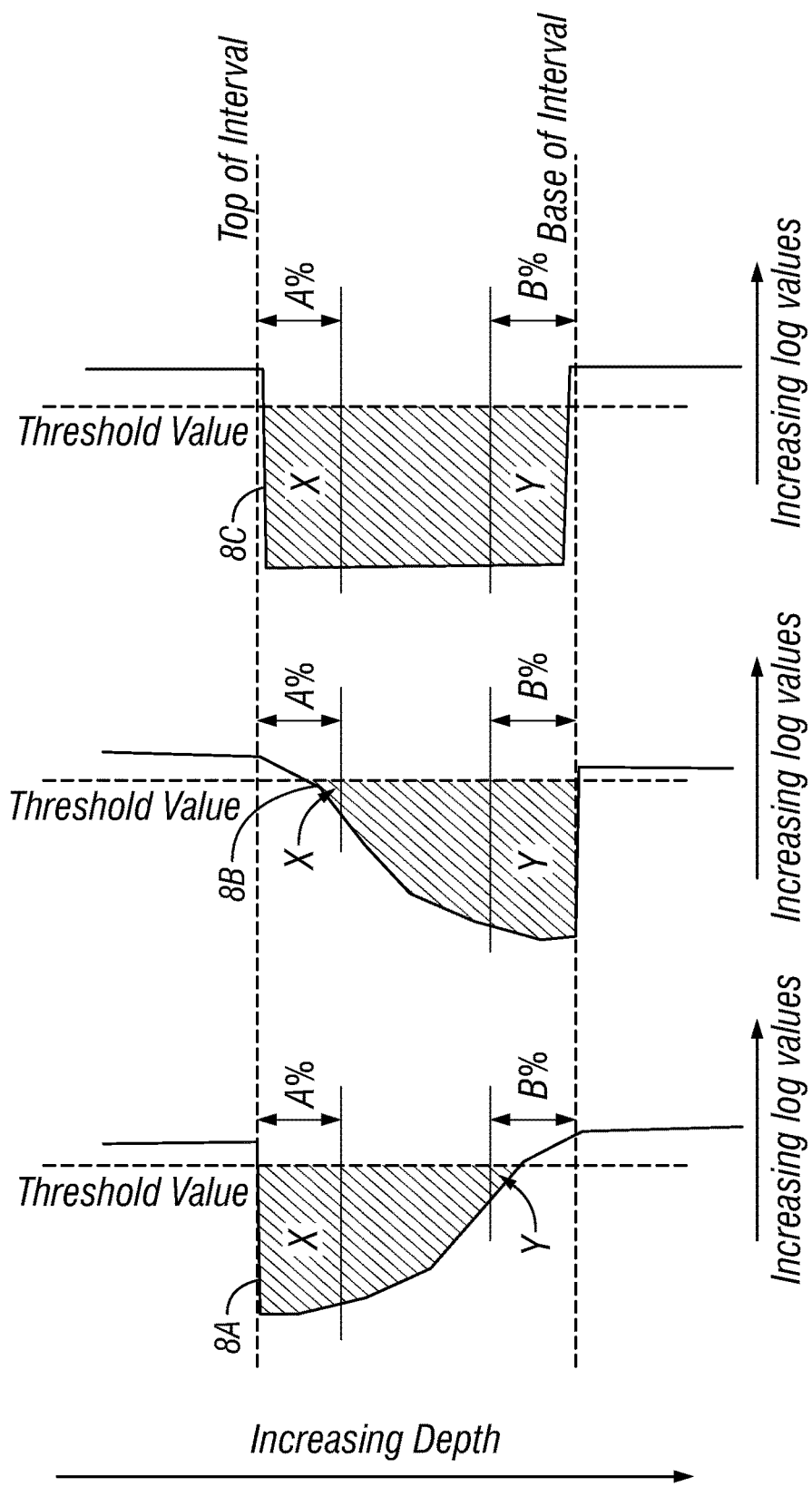
FIG. 12 shows an illustration of the Symmetrical Area Under the Curve Ratio Attribute. (A) In a coarsening upward sequence the ratio of area X to area Y will be a large positive number. (B) In a fining upward sequence the ratio of area X to area Y will be a small positive number. In a blocky sequence the ratio of area X to area Y will be approximately equal to one.

Symmetrical Area Under the Curve Ratio Attribute: This attribute evaluates the ratio of the area under the curve between the uppermost A percent and the lowermost B percent of a specified well log interval where A=B, as shown in FIG. 12 in the graphs at 8A, 8B and 8C, utilizing the integral between the well log values and a predetermined threshold value. This is advantageous for differentiating between fining upward patterns, coarsening upward patterns, and other log shape patterns that are present in FIG. 3 at 90-97.

Figure 13:
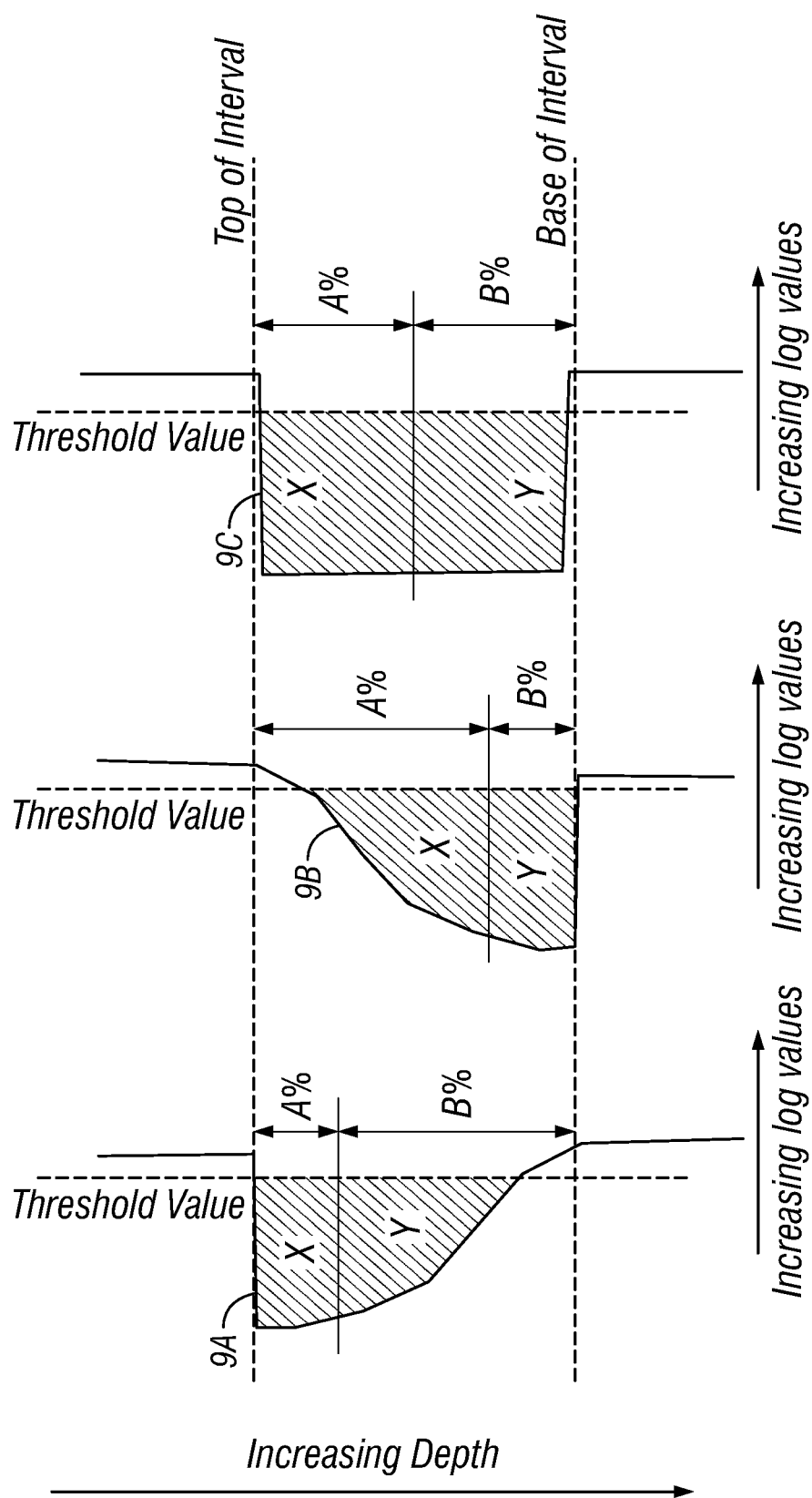
FIG. 13 shows an illustration of the Asymmetrical Area Under the Curve Ratio Attribute. Coarsening upwards (A) and fining upwards (B) log shape patterns will show non-linear increases in the value of the ratio of area X to area Y with increasing lengths of interval A. Blocky patterns (C) will show a linear increase in the value of the ratio of area X to area Y with increasing lengths of interval A.

Asymmetrical Area Under the Curve Ratio Attribute: This attribute evaluates the ratio of the area under the curve between the uppermost A percent and the lowermost B percent of a specified log interval where A+B=1, as shown in FIG. 13 in the graphs at 9A, 9B and 9C, using the integral between the well log values and a predetermined threshold value. This attribute may be advantageous for differentiating blocky and bow-shaped log patterns from other log shape patterns that are present in FIG. 3 at 90-97. This attribute may also be advantageous when the attribute is calculated three or more times with interval lengths where A>B, A=B, and A<B, then coarsening upwards, fining upwards, blocky, and bow-shaped log patterns can be distinguished from one another.

Figure 14:
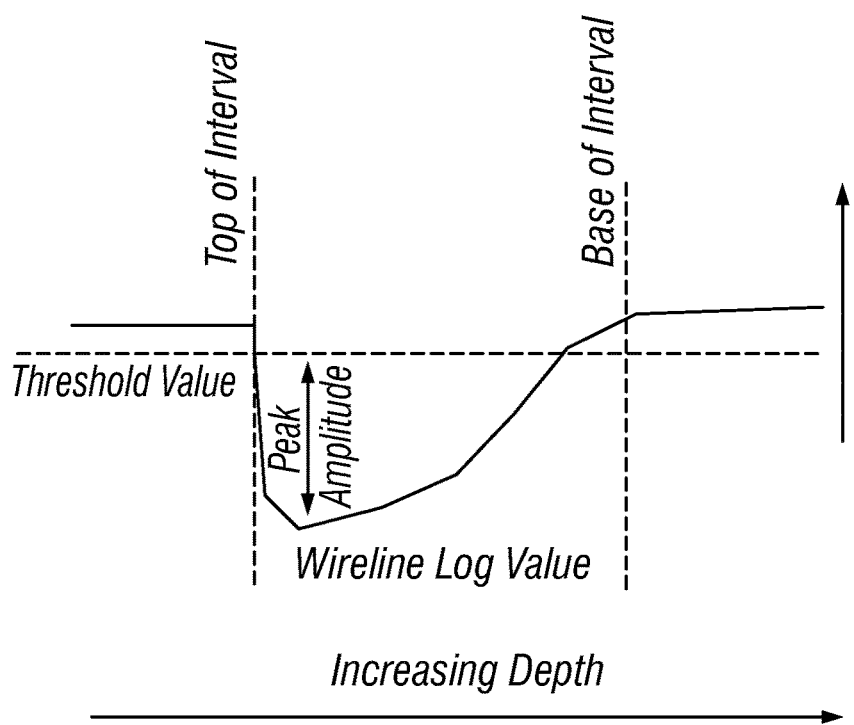
FIG. 14 shows an illustration of the Peak Amplitude Attribute.

Peak Amplitude Attribute: This attribute is defined as the absolute value of the difference of a pre-defined threshold value and the well log value in a specified log interval, as illustrated in FIG. 14. This attribute is advantageous for identifying the cleanest reservoir(s) in an interval and evaluating relative changes between multiple wells. Furthermore, the Peak Amplitude Attribute, when used in combination with the Area Under the Curve Attribute, may offer the advantage of identifying intervals that are not suitable for analysis.

Figure 15:
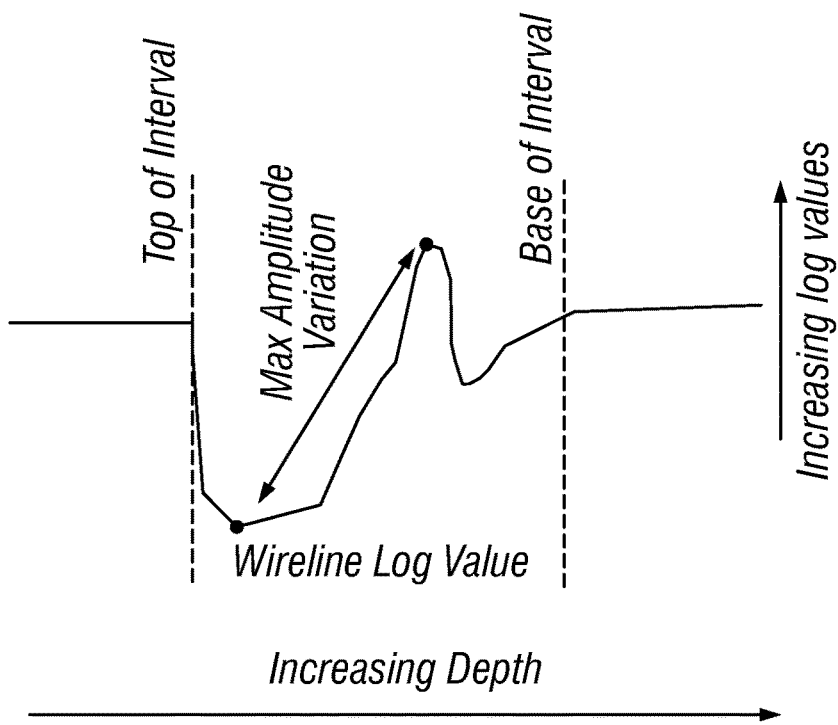
FIG. 15 shows an illustration of the Maximum Amplitude Variation Attribute.

Maximum Amplitude Variation Attribute: This attribute is defined as the absolute value of the difference between the minimum and maximum well log values in a specified log interval, as illustrated in FIG. 15. This attribute may be advantageous for evaluating the maximum variation in a data set, and may be useful in normalizing well log values when combined when used in combination with the peak amplitude attribute, and for identifying intervals where there is not enough variation present in the well log measurements to make a useful geologic evaluation from the well log measurement shape.

Figure 16:
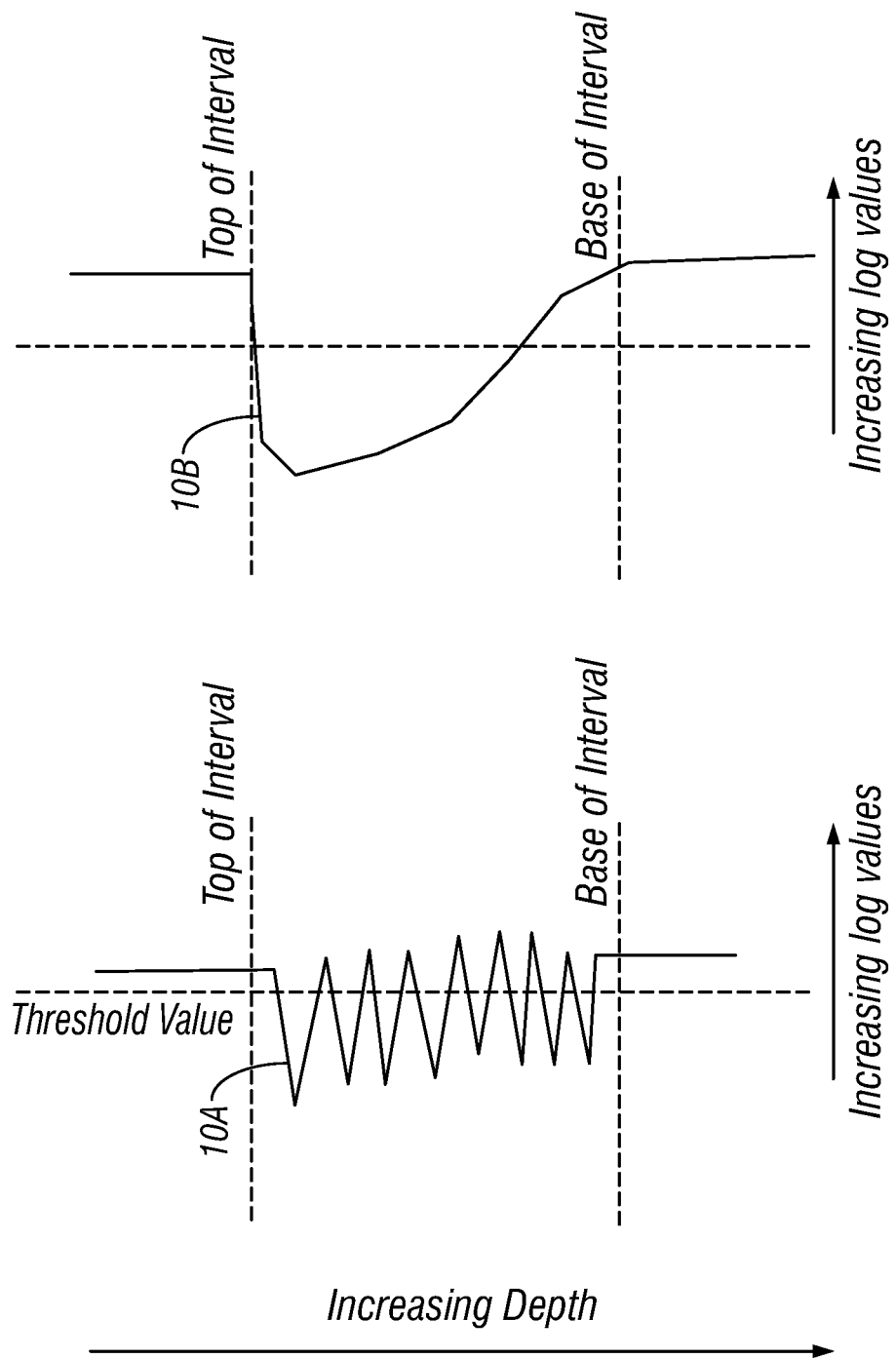
FIG. 16 shows an illustration of the Number of Threshold Crossings Attribute. (A) Example of a well log with several (sixteen) threshold crossings. (B) Example of a well log with minimal (2) threshold crossings.

Number of Threshold Crossings Attribute: A count of the number of times the well log value crosses a defined threshold value, as illustrated in FIG. 16 in the graphs at 10A and 10B. This attribute is advantageous for evaluating the complexity of stacked reservoir systems and in combination with other attributes can help distinguish serrated from blocky log shape patterns. The present attribute may identify serrated and composite log shape patterns. Furthermore, the present attribute may be advantageous when used in combination with attributes that can identify coarsening and fining upwards log shape patterns as it can identify if the well log data has a composite fining upward or composite coarsening upward log shape pattern.

Figure 17:
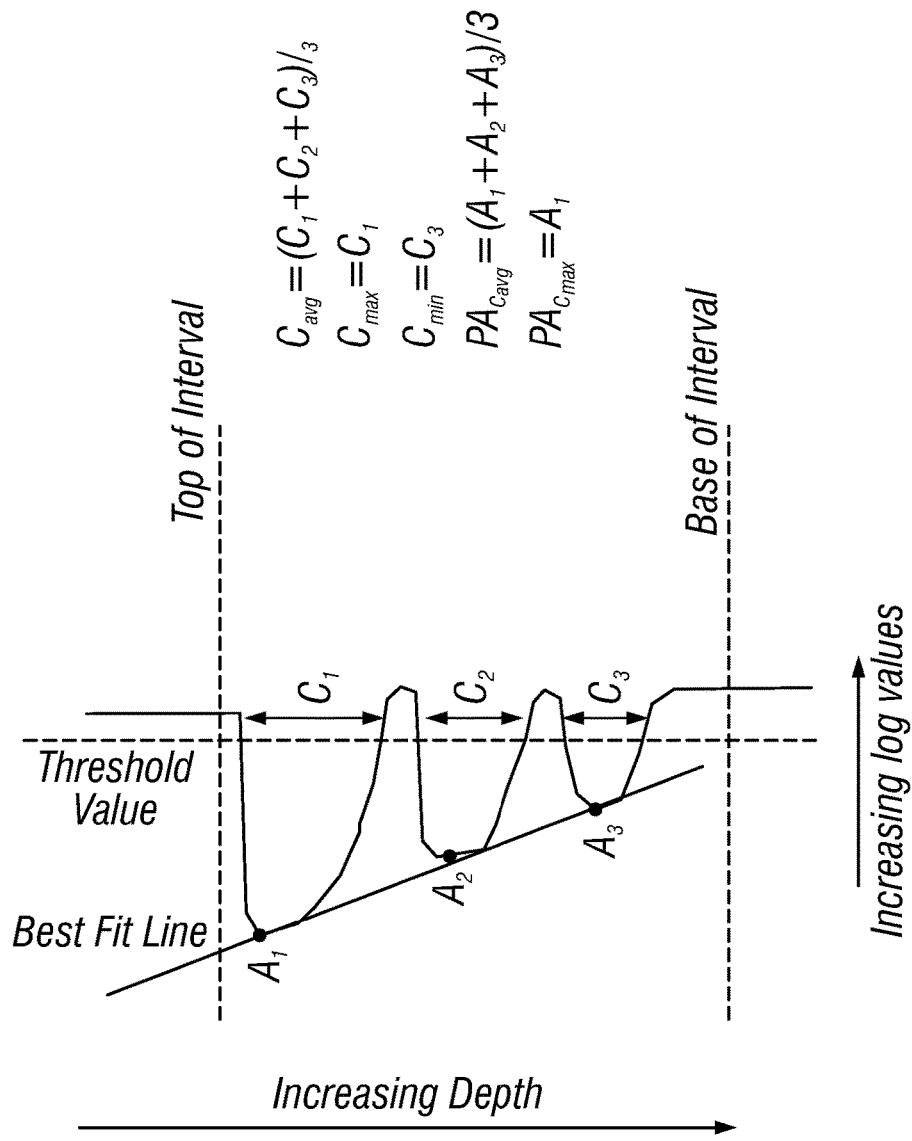
FIG. 17 shows an illustration showing the evaluation of attributes related to cycle lengths and peak amplitudes. In this figure C1>C2>C3 and A1>A2>A3.

Average Positive Cycle Length Attribute: This attribute measures the average length of a positive cycle $C_i$ as measured in the y-axis between threshold crossings in a specified interval, where $$C_{avg}=(C_1+C_2+\ldots+C_n)/n$$

as illustrated in FIG. 17. This attribute may be advantageous for evaluating the average thickness of reservoirs. Furthermore, this attribute may be advantageously used in conjunction with the Number of Threshold Crossings Attribute to distinguish between serrated log shape patterns and stacked blocky patterns.

Maximum Positive Cycle Length Attribute: This attribute measures the maximum length of a positive cycle as measured in the vertical (depth) axis between selected or pre-determined threshold crossings in a specified interval as illustrated in FIG. 17. This attribute may be advantageous for determining the maximum continuous thickness of a reservoir. The attribute may also be advantageous for aiding in the differentiation of blocky log shape patterns from serrated patterns. Furthermore, this attribute may be advantageously applied as a screening tool to determine if an interval is suitable for log shape pattern classification. If the Maximum Positive Cycle Length Attribute is less than the minimum reservoir thickness a user wants to classify than it can be screened out using this attribute. This may be expressed as: $Cmax=C_1$.

Minimum Positive Cycle Length Attribute: This attribute measures the minimum length of a positive cycle as measured in the depth axis between threshold crossings, in a specified interval as illustrated in FIG. 17. This attribute when used in combination with the number of threshold crossings attribute, is advantageous for evaluating reservoir complexity. This may be expressed as: $Cmin=C_3$.

Ratio of Maximum to Minimum Cycle Length Attribute: This attribute evaluates the ratio of the maximum positive cycle length attribute to the minimum positive cycle length attribute in a specified interval, as illustrated in FIG. 17. This attribute is advantageous for evaluating the degree of reservoir complexity.

Ratio of Maximum to Average Cycle Length Attribute: This attribute evaluates the ratio of the maximum positive cycle length attribute to the average positive cycle length attribute in a specified interval, as illustrated in FIG. 17. This attribute is advantageous for evaluating the degree of reservoir complexity.

Average Cycle Peak Amplitude Attribute: This attribute evaluates the average peak amplitude of all positive cycles where the peak amplitude for a cycle is defined as the absolute value of the difference of a pre-defined threshold value and the well log value in a specified interval, as shown in FIG. 17. The measurements of the individual amplitudes are performed in the same manner as the calculation for the peak amplitude attribute. This attribute is advantageous for evaluating the average shale content when multiple cycles are present. This may be expressed as: $PA_{Cavg}=(A_1+A_2+A_3)/3$.

Longest Cycle Length Peak Amplitude Attribute: This attribute evaluates the peak amplitude of the positive cycle with the longest length as measured in the depth axis in a specified interval, as illustrated in FIG. 17. This attribute is different from the peak amplitude attribute in that it is a measure of peak amplitude in the longest positive cycle only, and is not necessarily equal to the peak amplitude for the entire specified interval. This attribute, when used in combination with the regular peak amplitude attribute as outline above, may be advantageous in evaluating relative shale content of the thickest reservoir interval. Furthermore, this attribute may be advantageous in evaluating the changes between composite and serrated log shape patterns between wells or between different intervals within a well when attempting to identify which reservoirs are both the thickest and cleanest (i.e., have the least clay or shale content).

Ratio of Longest Cycle Length Peak Amplitude to Average Cycle Length Peak Amplitude Attribute: This attribute evaluates the ratio of the peak amplitude at the longest cycle length to the average cycle peak amplitude in a specified interval, as illustrated in FIG. 17. This method may be advantageous to determine if the thickest reservoirs are also the cleanest reservoirs. Furthermore, this attribute may be advantageous in evaluating the changes between composite and serrated log measurement shape patterns between wells or between different intervals within a well when attempting to identify which reservoirs are both the thickest and cleanest.

Best Fit Amplitude Line Slope Attribute: This attribute evaluates the slope of a best fit line through the peak amplitudes of each cycle in a specified interval, as illustrated in FIG. 17. This method is useful for differentiating between stacked fining upward, stacked coarsening upward, and serrated log shape patterns. This is shown as the "Best Fit Line" connecting points $A_1$, $A_2$ and $A_3$ in FIG. 17

Figure 18:
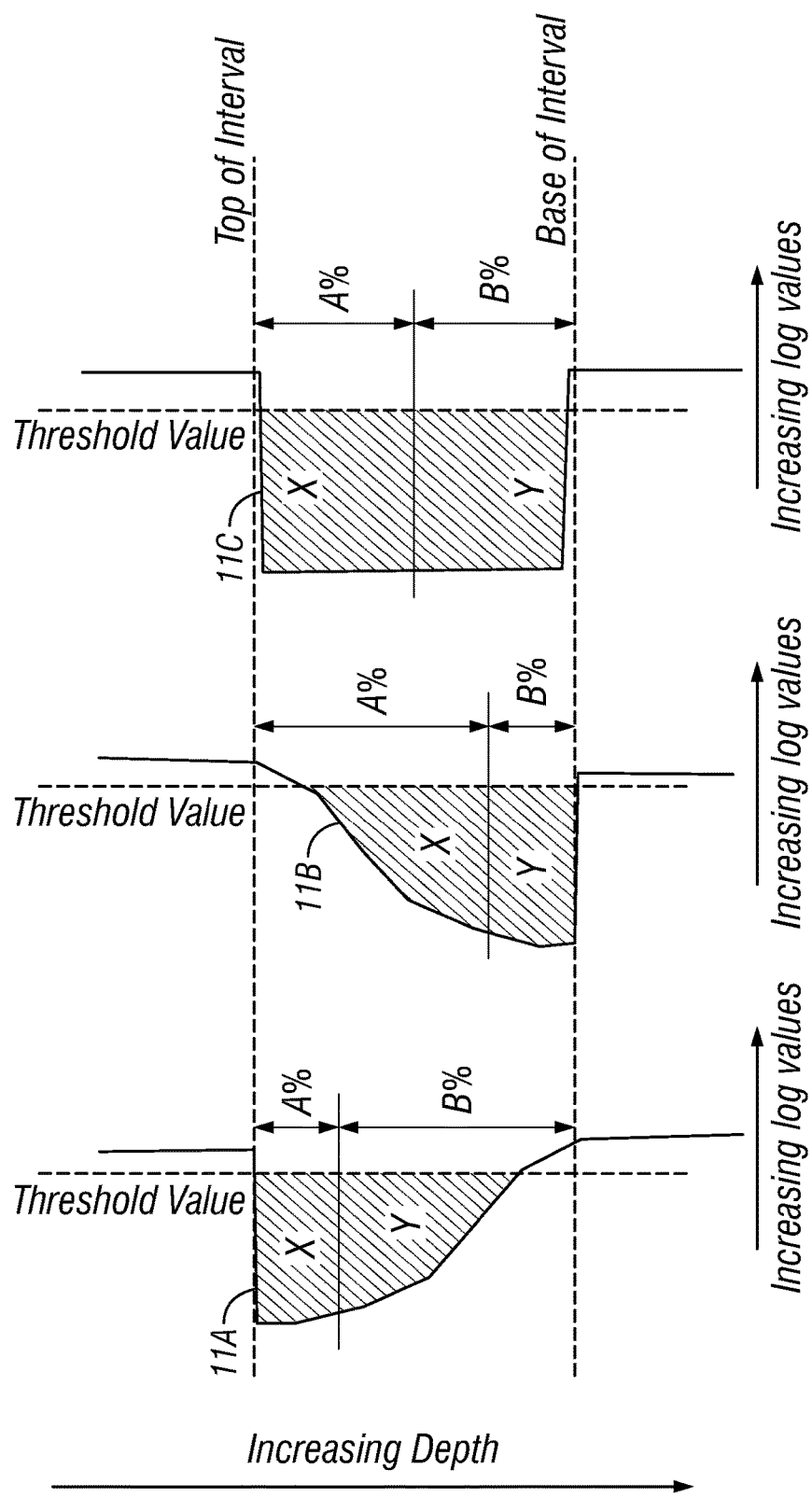
FIG. 18 shows an illustration of the Half Energy Attribute. The area X is depicted to equal area Y in all cases. (A) In a coarsening upwards sequence the length of interval A will be less than the length of interval B when areas X and Y are equal. (B) In a fining upwards sequence the length of interval A will be greater than the length of interval B when areas X and Y are equal. (C) In a blocky sequence the length of interval A will be greater than the length of interval B when areas X and Y are equal.

Half Energy Attribute: This attribute evaluates the percentage of a positive cycle required so that the area under the curve above a threshold is equal to one half of the total area under the curve, as shown in FIG. 18 at 11A, 11B and 11C. This method is useful for differentiating between fining upward, coarsening upward, and other log shape patterns as illustrated in FIG. 3.

Standard Deviation of Amplitude Attribute: This attribute is a measure of the standard deviation of the well log values in a specified interval as defined by the equation:

$$Ds = \sqrt{\frac{1}{N-1}\sum_{i=1}^{N}(x_i-\bar{x})^2}$$

Where N is the number of samples, and x is the well log value. This attribute can also be applied only to well log values above a designated threshold value. This attribute may be advantageous for evaluating the distribution of values in a data set. If the distribution of the data is narrow (i.e., a small range of values) and comprised of high values, then it is not suitable for classification inasmuch as it would be shaly. If the distribution is narrow and consistently low, than it is blocky.

This attribute can be used to determine if data in the specified interval are not suitable for classification. Additionally, the present attribute may be advantageous for distinguishing blocky log shape patterns from the other log shape patterns. Furthermore, this attribute may advantageous for evaluating the distribution of values in a well log measurement set before the determination of the selected axial interval of analysis.

Biased Estimator of Population Skewness Attribute: This attribute is a biased measure of the skewness of the well log values in a specified interval, which is defined by the equation:

$$g_1 = \frac{\frac{1}{n}\sum_{i=1}^{n}(x_i \bar{x})^3}{\left(\frac{1}{n}\sum_{i=1}^{n}(x_i - \bar{x})^2\right)^{3/2}}$$

Where x=the measurement value from the well log and n=number of samples. This attribute may be advantageous for evaluating differences in well log measurement sets over multiple user specified intervals. This attribute may also be advantageous in that blocky log shape patterns and shaley intervals may both be highly skewed, and can be distinguished from the other log shape patterns as shown in FIG. 3 at 90-97. When used in combination with other attributes (such as peak amplitude or area under the curve, for example) the present attribute may enable distinguishing blocky log shape patterns from shaly intervals.

Population Skewness Attribute: This attribute is a less biased measure of the skewness of the population of the well log values in a specified interval, which is defined by the equation:

$$G_1 = g_1 \frac{\sqrt{n(n-1)}}{n-2}$$

Where n is the number of samples and $g_1$ is the biased estimator of population skewness as calculated above. This attribute may be advantageous for evaluating differences in measurement sets over multiple user specified intervals. This attribute is advantageous in that blocky log shape patterns and shaley intervals are both highly skewed, and can be distinguished from the other log shape patterns observed in FIG. 3. When used in combination with other attributes (such as peak amplitude or area under the curve, for example) the present attribute may provide the advantage of distinguishing blocky log shape patterns from shaly intervals.

Figure 19:
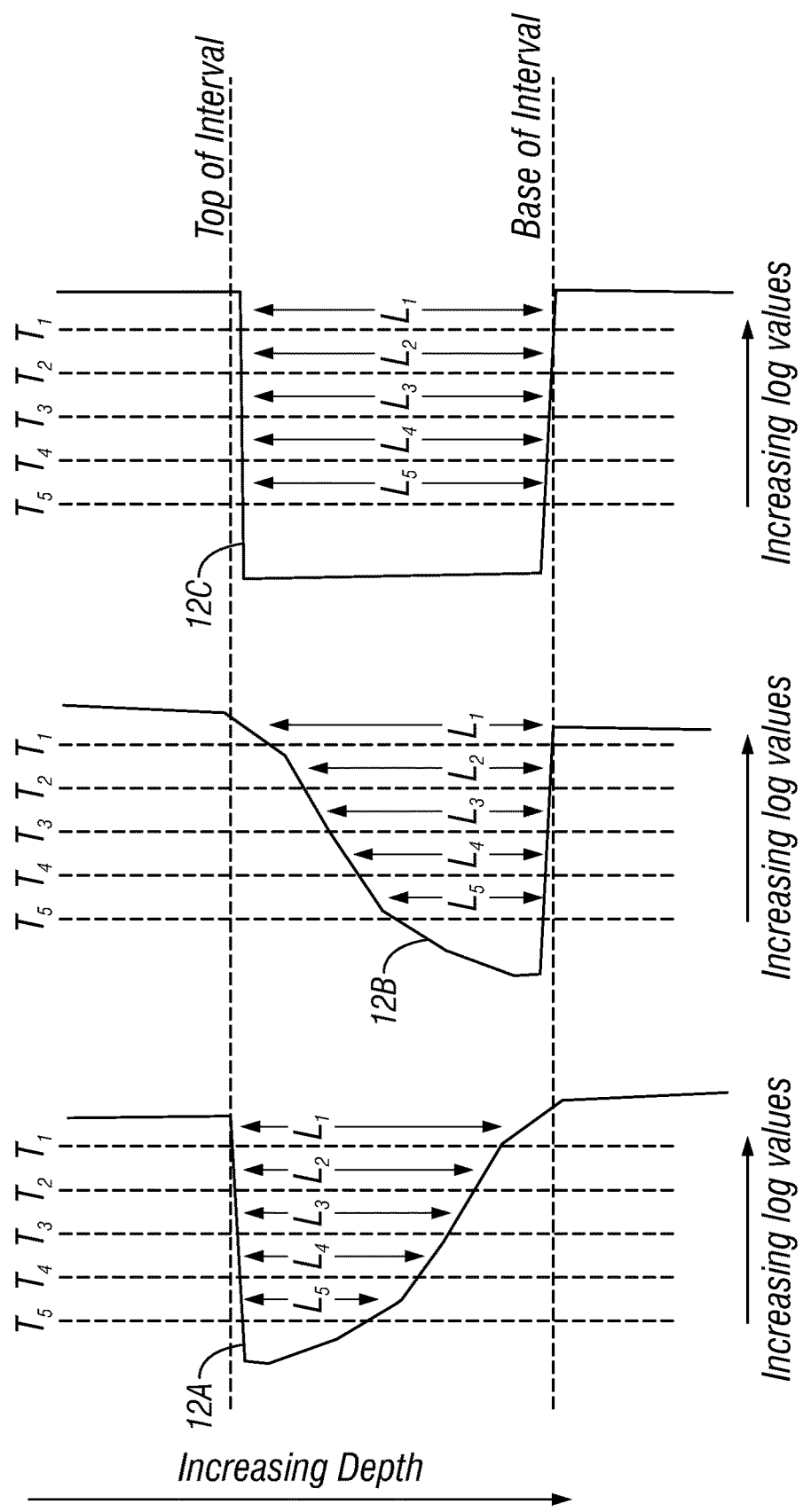
FIG. 19 shows an illustration of Threshold Size Ratio Attribute. (A) In a coarsening upward sequence the length of interval L will decrease with decreasing threshold values $(T_1, T_2, \ldots, T_n)$. (B) In a fining upward sequence the length of interval L will be decrease with decreasing threshold values $(T_1, T_2, \ldots, T_n)$. (C) In a blocky sequence the length of interval L will be relatively constant with decreasing threshold values $(T_1, T_2, \ldots, T_n)$.

Threshold Size Ratio Attribute: This attribute evaluates the ratio of a positive cycle lengths at multiple given threshold values, e.g., $T_1$ through $T_5$, as shown in FIG. 19 in the graphs at 12A, 12B and 12C. This attribute is advantageous for distinguishing fining and coarsening upwards sequences from blocky or bow-shaped sequences.

Figure 20:
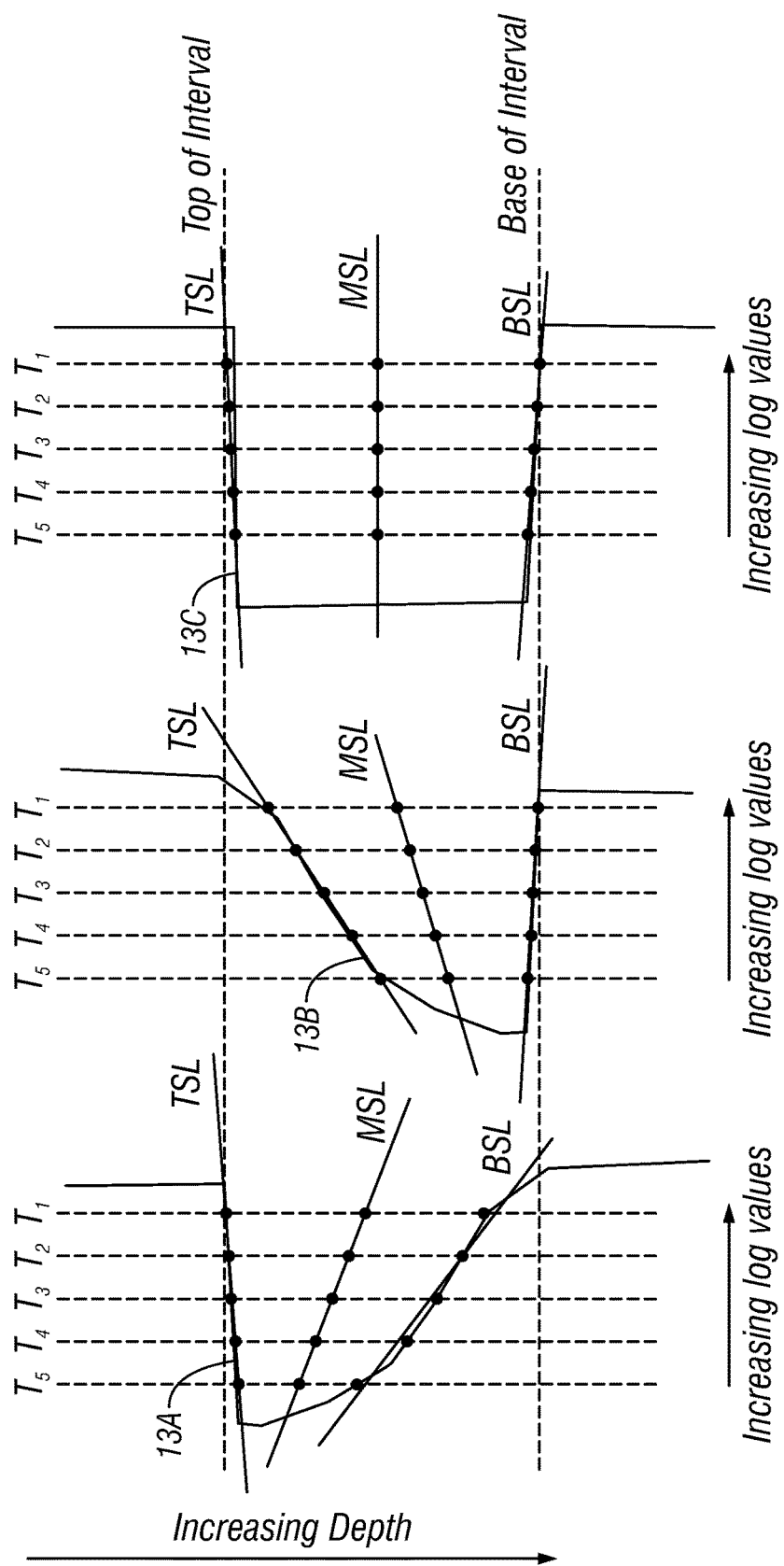
FIG. 20 shows an illustration of Threshold Intercept Top Slope, Threshold Intercept Base Slope, and Threshold Intercept Midpoint Slope Attributes. TSL=Top Slope Line, BSL=Base Slope Line, and MSL=Midpoint Slope Line. (A) In a coarsening upward sequence the slope of the TSL will be a low negative value, the slope of the BSL will be positive and greater than the MSL, and the MSL will be positive. (B) In a fining upward sequence the slope of the BSL will be a low positive number, the slope of the TSL will be negative and steeper than the slope of the MSL, and the MSL will be negative. (C) In a blocky sequence the TSL and BSL will be low negative and low positive numbers, respectively, roughly of the same magnitude. The MSL will have a relatively flat slope.

Threshold Intercept Top Slope Attribute: This attribute evaluates the slope of a best fit line TSL through the uppermost intersection of a progressively decreasing threshold value and the well log values of a single positive cycle, as shown in FIG. 20 at 13A, 13B and 13C. This attribute, when used in conjunction with the threshold intercept base slope attribute and threshold intercept midpoint slope attribute can distinguish among blocky, bow-shaped, fining upward, and coarsening upward patterns.

Threshold Intercept Base Slope Attribute: This attribute evaluates the slope of a best fit line BSL through the lowermost intersection of progressively decreasing threshold value and the well log values of a single positive cycle, as shown in FIG. 20 at 13A, 13B and 13C. This attribute, when used in conjunction with the threshold intercept top slope attribute and threshold intercept midpoint slope attribute can distinguish among blocky, bow-shaped, fining upward, and coarsening upward patterns.

Threshold Intercept Midpoint Slope Attribute: This attribute evaluates the slope of a best fit line MSL through the midpoint (average) of the uppermost and lowermost intersections of progressively decreasing threshold value and the well log measurement curve, as shown in FIG. 20 in the graphs at 13A, 13B and 13C. This attribute, when used in conjunction with the threshold intercept base slope attribute and threshold intercept top slope attribute can distinguish among blocky, bow-shaped, fining upward, and coarsening upward patterns.

Figure 21:
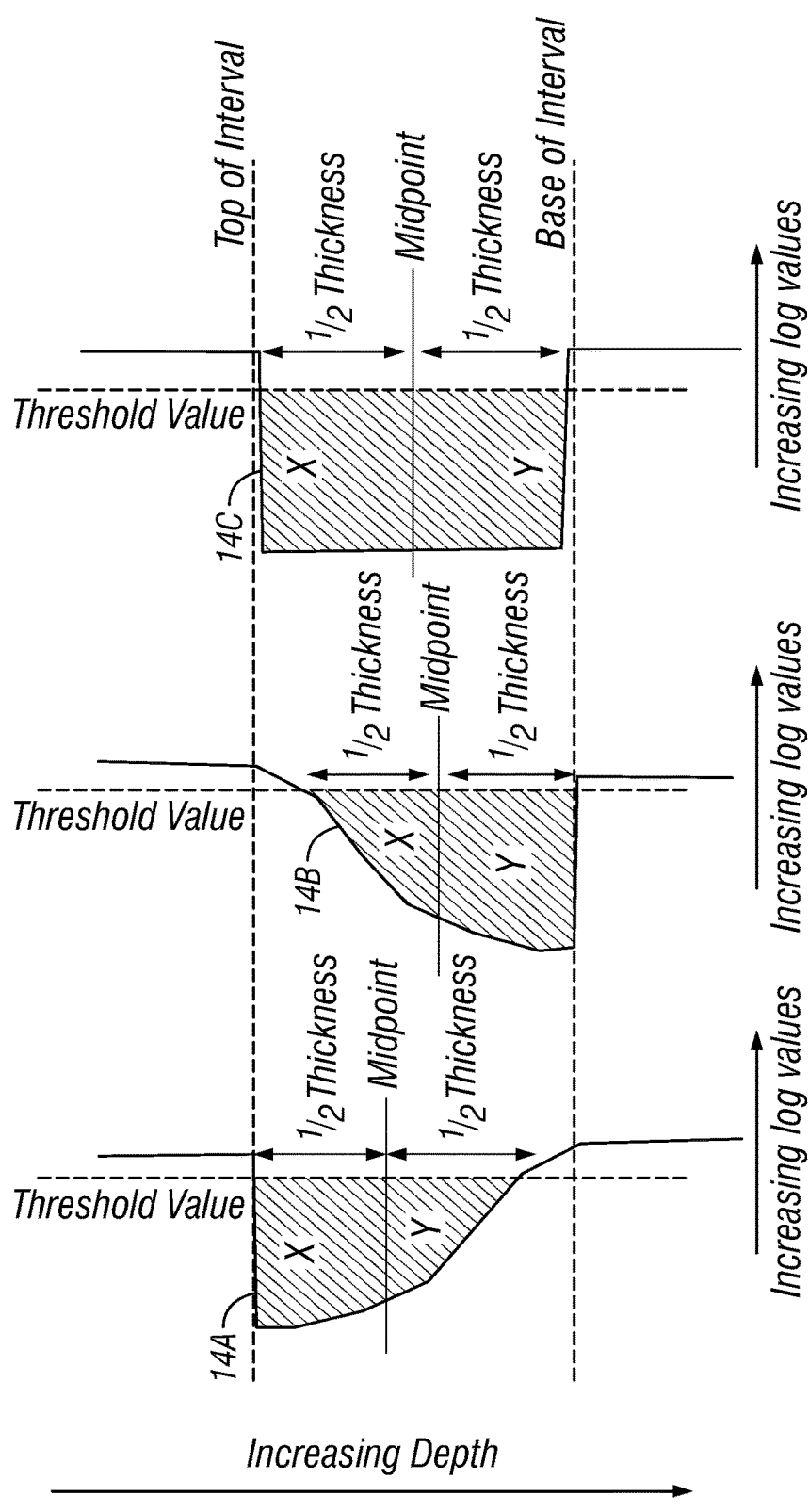
FIG. 21 shows an illustration of Half-Interval Area Ratio Attribute. The midpoint line is equidistant to the top and bottom of zone in all cases; the constant is a user defined variable scaled for desired result. (A) In a coarsening upward sequence the length of interval, the area X will be larger than the area of Y plus a constant. (B) In a fining upward sequence, the area X will be less than the area of Y plus a constant. (C) In a blocky or bow-shaped log shape pattern the, area of X will be approximately equal to the area of Y plus a constant.

Half-Interval Area Ratio Attribute: This attribute evaluates the ratio of the area under the curve for the well log values relative to a threshold value for the top half and bottom half of a specified log interval. This method is advantageous for distinguishing fining upward and coarsening upward log shape patterns from the other log shape patterns shown in FIG. 3 at 90-97. FIG. 21 illustrates this concept, wherein thresholds are selected at curves in each of the graphs at 14A, 14B and 14C, and corresponding threshold values are shown. The axial span of one half (½) the total integral may be used to identify the curve pattern as shown in FIG. 21.

Figure 22:
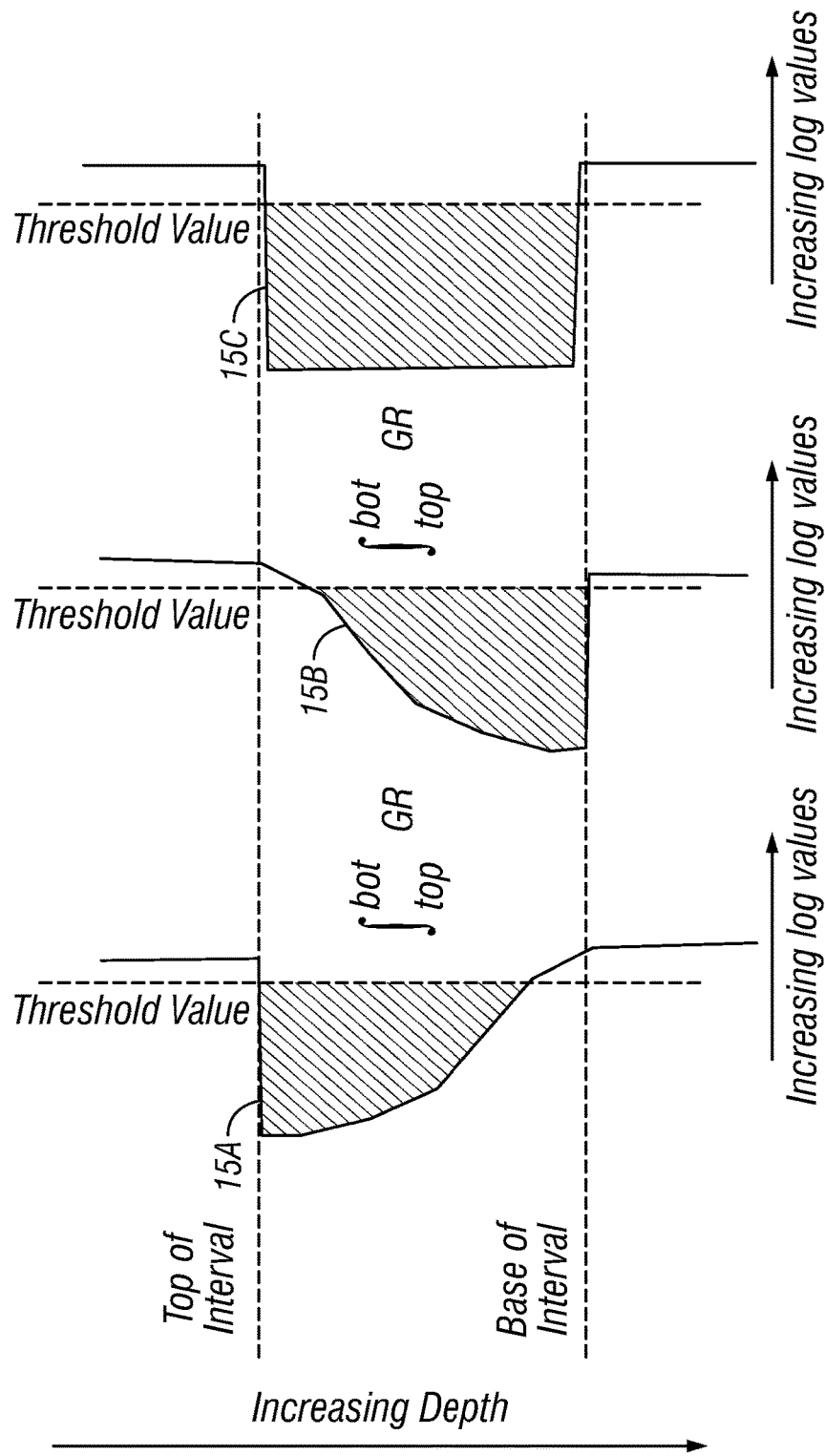
FIG. 22 shows an illustration of Integral Method. (A) In a coarsening upward sequence the integral of the well log values will have a very large slope and eventually plateau as the interval base is reached. (B) In a fining upward sequence integral of the well log value will have a very small slope and will increase significantly as the interval base is reached. (C) In a blocky sequence integral of the well log will have a very linear nature.
Figure 22:
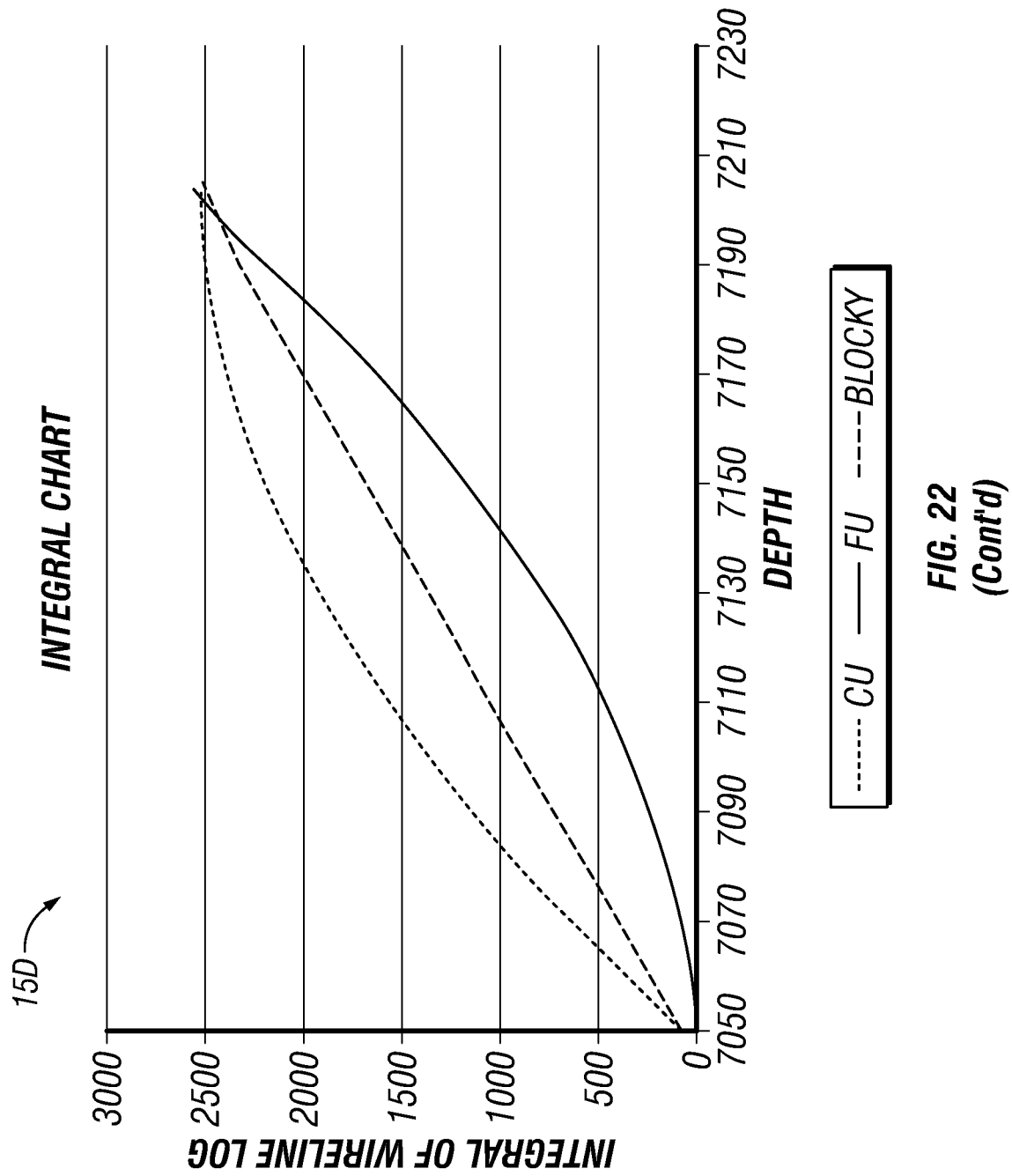

Furthermore, in accordance with needs created by shortcomings in the prior arts the present invention claims the following methods that can be advantageously applied in characterizing the geology of the subsurface:

Integral Method: This method evaluates the integral of the well log curve above a threshold value. The line characteristics of the resulting integral are advantageous in that they can distinguish between various log shape patterns including, but not limited to, coarsening upward, fining upward, blocky, and bow-shaped log patterns. FIG. 22 illustrates this concept. Areas under log curves between the curve and a selected threshold value, shown in the graphs at 15A, 15B and 15C, and their respective integral values with respect to depth (axial position) are shown in the graph at 15D. The shape of the curves in the graph at 15D may identify the pattern type.

Figure 23:
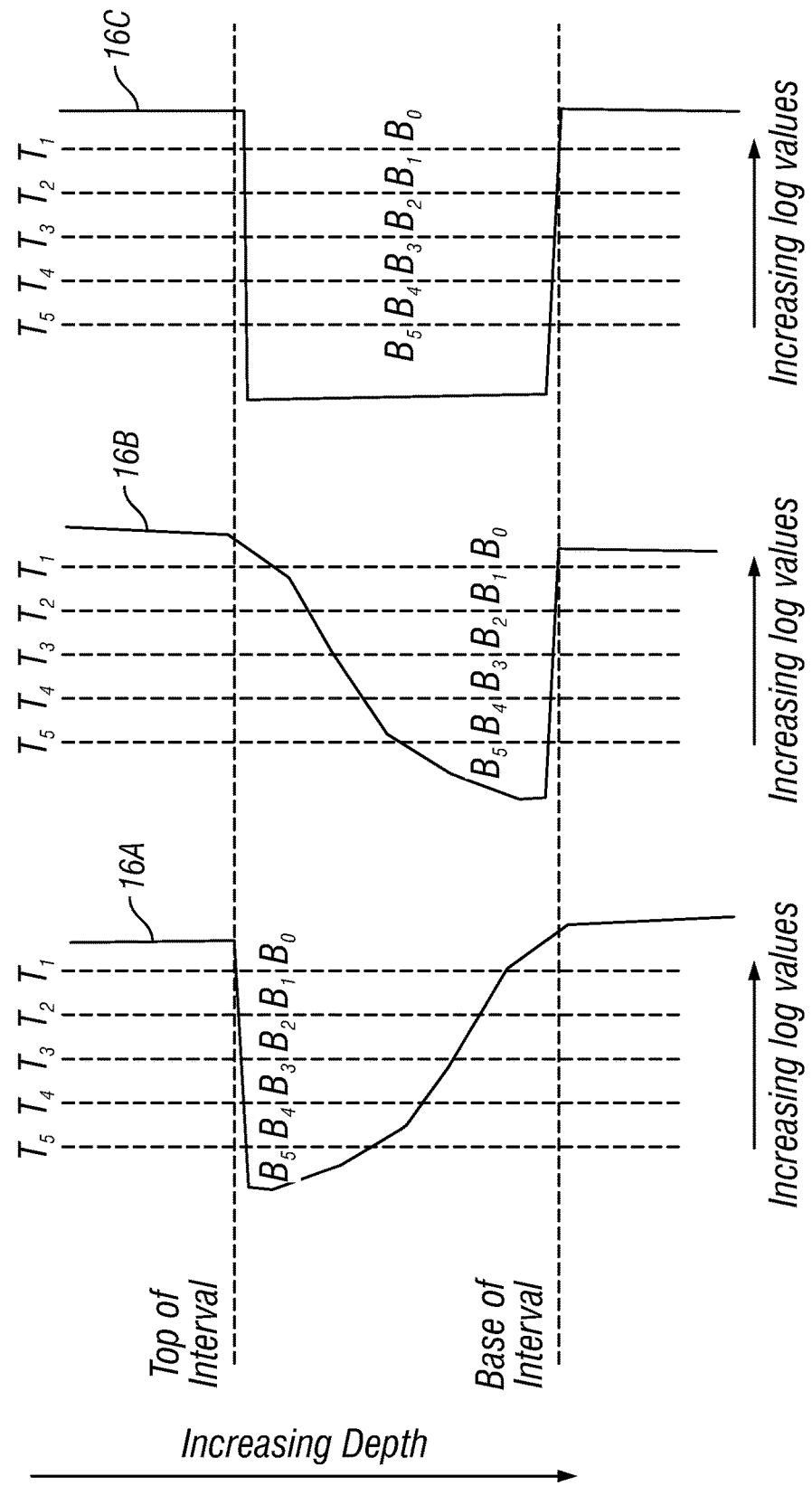
FIG. 23 shows an illustration of Vertical Line Test Method. (A) In a coarsening upward sequence the number of data points within each bin is relatively constant. (B) In a fining upward sequence the number of data points within each bin is relatively constant. (C) In a blocky sequence the number of data points is skewed heavily within one of the bins. This methodology will identify blocky log shape patterns.
Figure 23:
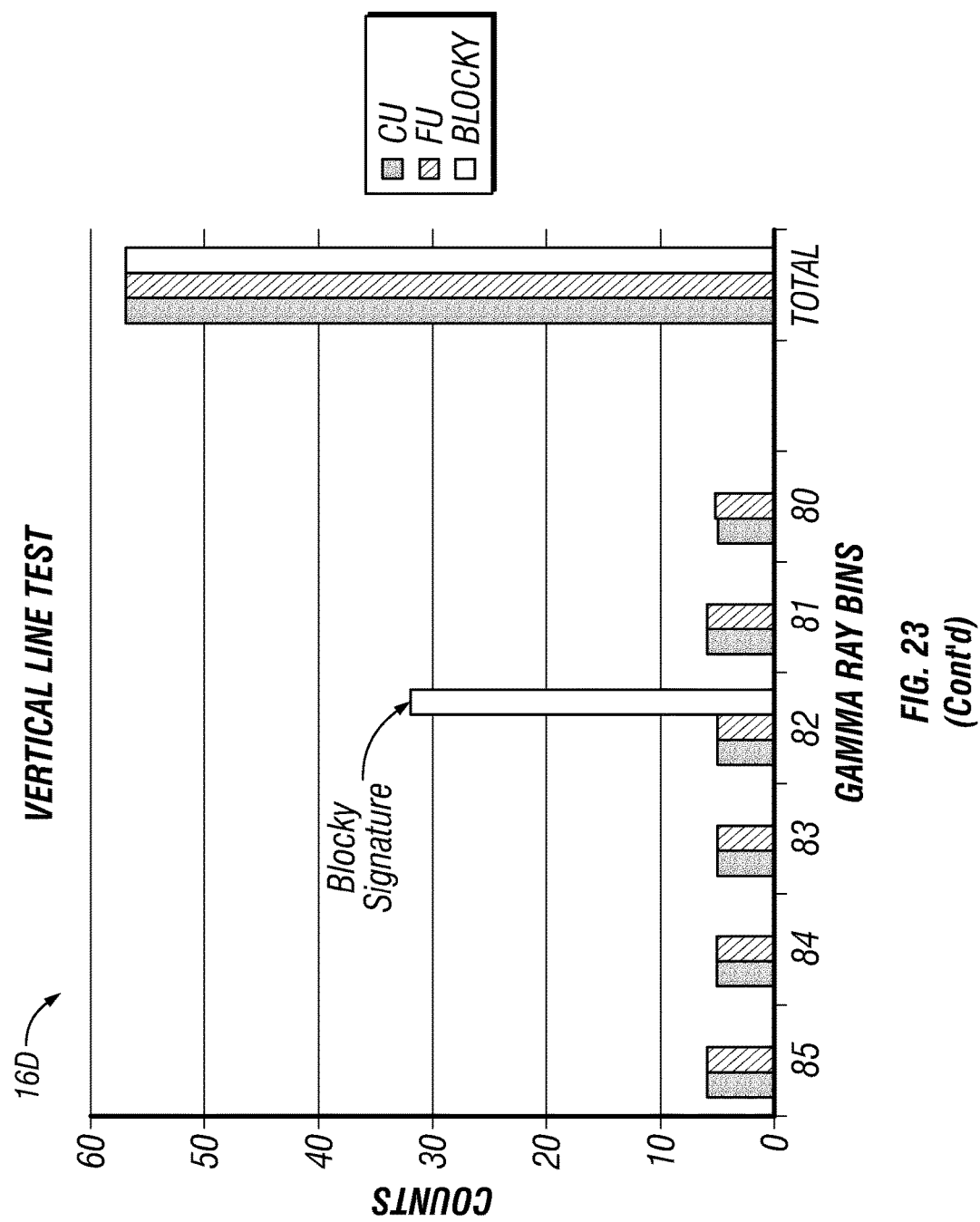

Vertical Line Test Method: This method divides the count of the well log vales that lie between threshold values, e.g., $T_1$ through $T_5$ in a specified log interval into discrete bins, $B_0$ through $B_5$ and then compares the population (number of axially sampled values) of the largest bin to total number of points within the interval. This ratio is advantageous for identifying blocky log shape patterns. FIG. 23 illustrates this concept. Binning is shown in graphs 16A, 16B, and 16C as segregated into bins $B_0$ through $B_5$. The bin populations are shown in the histogram at 16D in FIG. 23.

Furthermore, the present disclosure also describes the following methods that can be advantageously applied in classifying the log shape patterns in a specified interval into the classification scheme shown in FIG. 3 using the attributes derived from the well log data, including but not limited to the attributes calculated above:

Neural Network Method for Classification: This method utilizes a neural network that is a trained on a sample dataset utilizing a plurality of the attributes and methods described above to classify the log-shape patterns observed in the well log data into the log shape pattern types given in FIG. 3. Using a trained artificial neural network may enable classifications of log measurements shape patterns to be of a higher certainty, and may also be used as a filter to identify well log measurements that need a secondary attribute to be applied in order to identify geologic features For example, the neural network could be optimized for identifying all well log measurements with a coarsening upwards or fining upwards pattern. The identified patterns could then be subjected to further tests to evaluate if they are composite or simple log measurement shape patterns.

Figure 24:
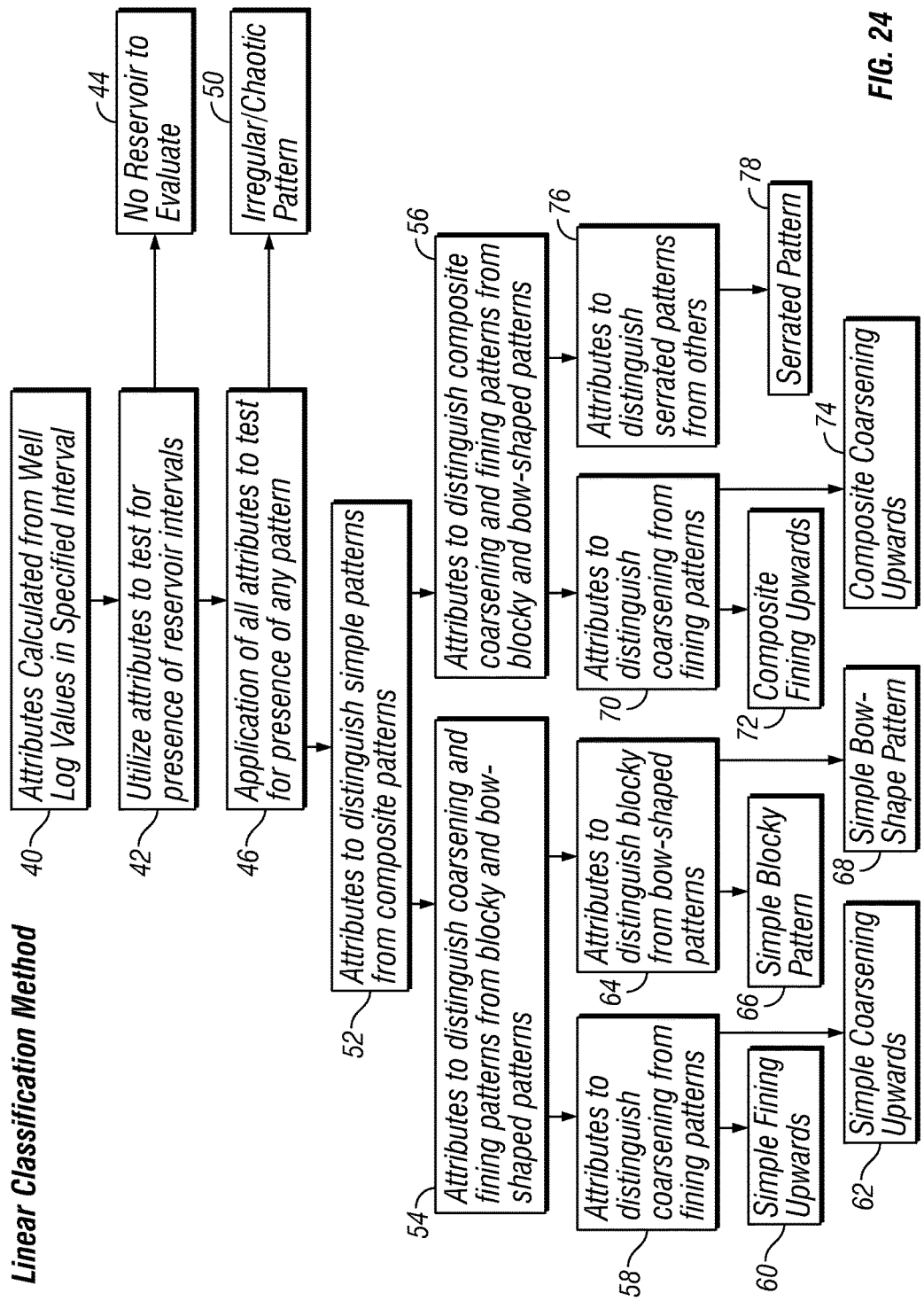
FIG. 24 shows a flow chart of an example Linear Classification Method.

Linear Classification Method: This method utilizes linear classification, or winnowing, to classify the data in a specified interval into the log shape pattern types given in FIG. 3. In the specified interval the attributes and methods given above are used sequentially to test each interval to determine its likely log-shape pattern based on prescribed values for each log shape pattern type using a trained artificial neural network. This is illustrated in the flow chart in FIG. 24. This method may be advantageous in distinguishing composite log shape patterns from simple log shape patterns and blocky or bow-shaped patterns from serrated patterns by using multiple attributes in combination to identify one measurement pattern from another. At 40, attributes of a well log curve are calculated within a specified interval. At 42, the interval is evaluated for the presence of features indicative of the presence of reservoir formations. At 44, the process stops if there are no such features. At 46, if there is one or more reservoir formations, the well log curve is evaluated to determine the presence of one or more patterns. At 50, the process stops if no patterns are detected (irregular or chaotic pattern).

At 52, the attributes determined by one or more techniques as explained above may be used to distinguish whether the patterns are simple or complex. At 54 the attributes may be used to determine coarsening or fining upward patterns from blocky of bow patterns. At 58, coarsening upward patterns may be distinguished from fining upward patterns, at 62 and 60, respectively. At 64, bow patterns may be distinguished from blocky patterns, shown respectively at end of procedure points 66 and 68, respectively.

At 56, composite patterns may be identified, including combinations of coarsening upward, fining upward, bow shaped and blocky patterns. At 70, coarsening upward patterns may be distinguished from fining upward patterns, as shown at process end points, 74 and 72, respectively. At 76, serrated patterns may be distinguished from blocky, bowed, coarsening upward and fining upward patterns, finally to indicate a serrated pattern in a composite pattern at process end point 78.

The artificial neural network, and/or deterministically, any of the example processes explained with reference to FIGS. 3A, 3B and 6 through 23 may be implemented on a computer system as explained below with reference to FIG. 25.

Below is an explanation of various geologic features and phenomena that may be identified using well log measurement attributes determined as explained above.

Gamma ray well logging instruments, for example, measure the naturally occurring radioactivity of rocks. Inasmuch as the naturally occurring radioactive elements are typically concentrated in shales and in other formations having high clay mineral content, the gamma-ray log generally shows a close relationship to grain size, with coarser grain sizes corresponding to lower gamma-ray measurements and finer grain sizes corresponding to higher gamma-ray measurements. This relationship has led geoscientists to use the log shape patterns observed in well log measurements to make interpretations on depositional environment. It should be understood that the following examples are based on gamma ray well log measurements, but using gamma ray measurements is not a limit on the scope of the present disclosure.

Coarsening Upward Log Shape Patterns

Simple Coarsening Upward: A simple coarsening upward well log measurement curve shape is defined as having a significant decrease in the gamma-ray measurement with increasing depth over the axial interval of interest. This log measurement shape typically would not have any intermediate shale breaks. The pattern typically has an abrupt change from low to high gamma ray measurements at the top of the interval.

Composite Coarsening Upward: A composite coarsening upward well log measurement curve shape is defined as having a significant decrease in the gamma ray measurement with increasing depth over the interval of interest. This log measurement shape is distinguished from a simple coarsening upward log shape by the presence of intermediate shale breaks (e.g., intervals if high gamma ray measurement value) within the interval of interest. The patterns typically have an abrupt change from low to high gamma-ray measurements at the top of the interval.

Coarsening upwards log shape patterns, in a general sense, represent a higher energy sedimentary depositional setting at the end of sediment deposition relative to the onset of sediment deposition, and are typical in progradational systems. These patterns are often interpreted to represent the following depositional environments: Barrier bars; delta fronts; regressive marine sands; distributary fronts; crevasse splays; distributary mouth bars; shallow marine sheet sands; carbonate shoals; shore faces, and strand plains. Composite patterns can be generated by deposition in any of the environments associated with simple-coarsening upward log shape patterns, but suggest abrupt changes in energy during deposition, which result in interlayered shaly or silty beds. The abrupt change in energy is sometimes interpreted to be a result of deposition on the fringe of the system.

Fining Upward Log Shape Patterns

Simple Fining Upward: A simple fining upward measurement shape is defined as having a significant increase in the gamma ray measurement with increasing depth over the interval of interest. This log measurement shape typically would not have any intermediate shale breaks. The measurement shapes typically have an abrupt change from low to high gamma-ray measurements at the base of the interval.

Composite Fining Upward: A composite fining upward trend is defined as having a significant increase in the gamma ray measurement value with increasing depth over the interval of interest. This log measurement shape may be distinguished from a simple fining upward log shape pattern by the presence of intermediate shale breaks within the interval of interest. The measurement curve shapes typically have an abrupt change from low to high gamma-ray measurements at the base of the interval.

Fining upward log shape patterns, in a general sense, represent a lower energy depositional setting at the end of deposition relative to the onset of deposition, and are typical in retrogradational systems. These patterns are often interpreted to represent the following depositional environments: fluvial point bars; distributary channel fill; transgressive marine sands; tidal point bars; transgressive shelf sands; sand drapes over reefs; tidal flats; and deep-tidal channel fill. Composite patterns can be generated by deposition in any of the environments associated with simple-fining upwards log shape patterns, but suggest abrupt changes in energy during deposition, which result in the interlayered shaly or silty beds. The abrupt change in energy is sometimes interpreted to be a result of deposition on the fringe of the system.

Blocky and Bow Log Measurement Curve Shapes

Blocky: A blocky shape is defined as having a relatively consistent and low gamma-ray measurement throughout the interval of interest. The patterns typically have an abrupt change from low to high gamma ray measurements at the top and base of the interval.

Blocky log measurement shapes, in a general sense, represent constant energy throughout the depositional cycle, and are typical in aggradational systems. These patterns are often interpreted to represent the following depositional environments: braided fluvial; distributary channel fill; turbidite fans; submarine canyon fill; Aeolian dunes; and carbonate shelves and reefs.

Bow: A bow measurement shape is defined as having a significant decrease in the gamma-ray log measurement with increasing depth over a first portion of the selected axial interval, followed by a significant increase in the gamma-ray log measurement with increasing depth over a second portion of the selected axial interval.

Bow log shape patterns, in a general sense, represent a gradual increase to higher energy from the onset of deposition to the midpoint of deposition, followed by a gradual decrease to lower energy until the end of deposition. These patterns types are often interpreted to represent the following depositional environments: offshore bars; reworked offshore bars; regressive to transgressive shore face deltas; and amalgamations of coarsening and fining upwards patterns.

Serrated Log Measurement Shapes

Serrated: Serrated log measurements are defined as having no consistent trend in the gamma ray log measurement with increasing depth, and are identified by a relatively high-frequency change between high and low gamma-ray measurements over short depth (axial) intervals.

Serrated measurement shapes, in a general sense, represent a series of abrupt changes in energy throughout a unit's depositional history, and are typical in aggradational systems. Serrated log shape patterns are often interpreted to represent the following depositional environments: fluvial floodplains; storm-dominated shelves; and distal marine slopes.

Shaly and Irregular Log Measurement Shapes

Shaly: A Shaly log measurement pattern is defined as having a relatively consistent and high gamma-ray value throughout the interval of interest. Shaly intervals are typically not described as having a definable log-shape pattern.

Shaly log shape patterns are indicative of continuous shale deposition and are generally interpreted to represent a continuously low energy depositional environment. Some examples include: deep water marine settings; carbonate banks; and marine shales.

Irregular/Chaotic/No Pattern: Well log measurements that cannot be classified or correlated to one of the above log shape patterns, and are not shaly, are classified as irregular, chaotic, or as not having a pattern. Irregular log shape patterns are often associated with deposition in fluvial floodplains, carbonate slopes, clastic slopes, and canyon fill.

Thus, by using attributes determined as explained above, the user may infer possible depositional environments. The foregoing patterns are shown, respectively, in FIG. 3 at 90-97.

Figure 25:
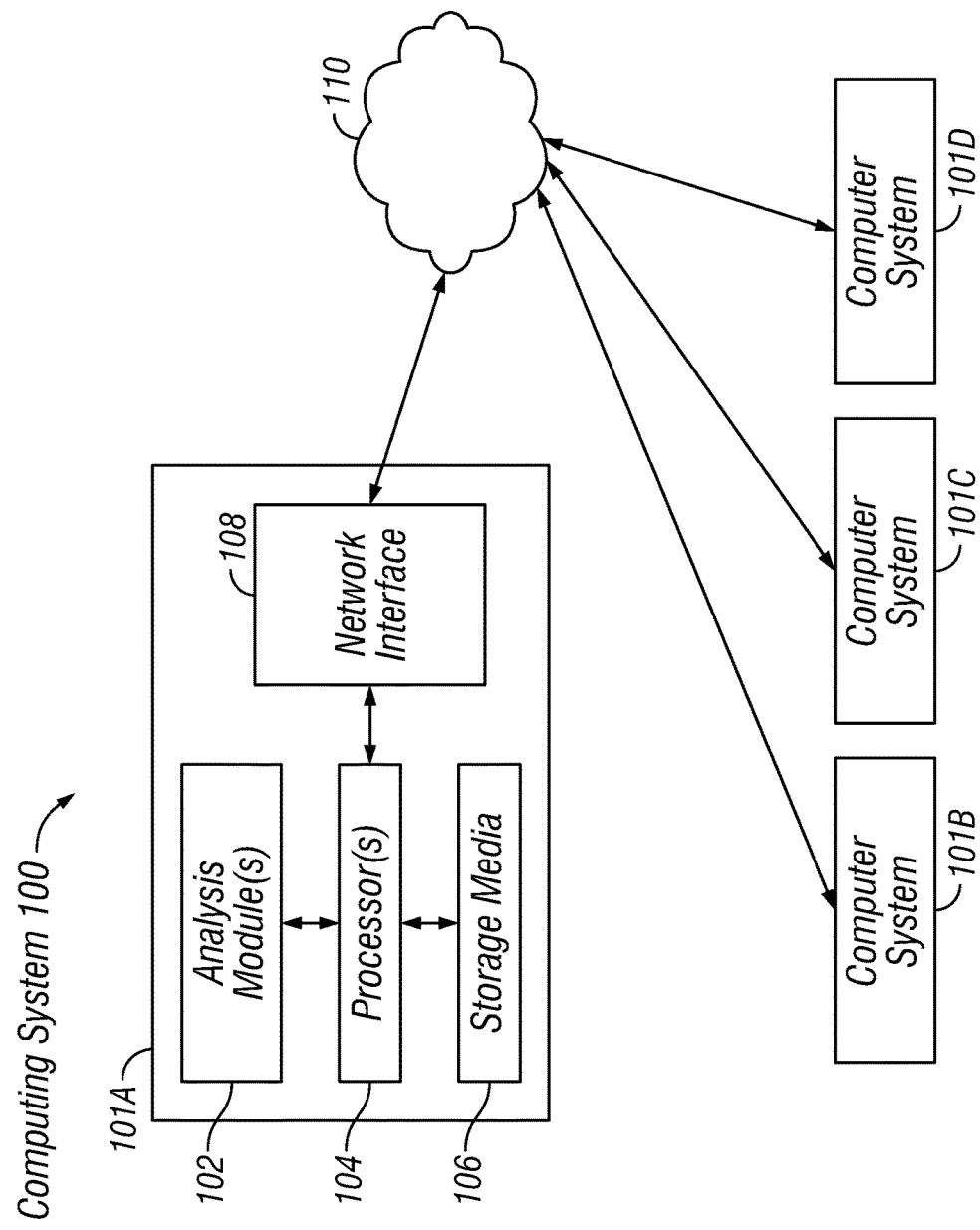
FIG. 25 shows an example computer system that may be used in various example methods according to the present disclosure.

FIG. 25 depicts an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks depicted in FIGS. 6 through 24. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be on a ship underway on the ocean or on a well drilling location, while in communication with one or more computer systems such as 101C and/or 101D that may be located in one or more data centers on shore, aboard ships, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the exemplary embodiment of FIG. the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 25, and/or computing system 100 may have a different configuration or arrangement of the components depicted in FIG. 25. The various components shown in FIG. 25 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Any one or more components of the computer system 100 may be implemented in the surface recording units shown in FIGS. 4 and 5.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for characterizing subsurface formations penetrated by a wellbore, comprising:
    accepting as input to a computer measurements of a physical parameter of the formations made over a selected axial interval of the wellbore;
    in the computer calculating at least one attribute of the measurements (measured values) from a change in the measurements over the selected axial (depth) interval, wherein the attribute is directly related to a shape of a curve defined by the change in measurements over the selected axial interval, wherein the calculating the at least one attribute comprises at least one of (i) determining a slope of a best fit line through a shallowest axial intersection of a progressively decreasing threshold value and the measurement values in a single cycle exceeding the progressively decreasing threshold value, (ii) determining a slope of a best fit line through a deepest axial intersection of a progressively decreasing threshold value and the measurement values in a single cycle exceeding the progressively decreasing threshold value, and (iii) determining a slope of a best fit line through a midpoint (average) of a shallowest and a deepest axial intersection of a progressively decreasing threshold value and the measurement values; and
    in the computer determining a characteristic of the formations in the selected axial interval using the at least one attribute, wherein the characteristic is related to the defined shape.

2. The method of claim 1 wherein the at least one attribute comprises a symmetrical ratio or a symmetrical ratio slope.

3. The method of claim 1 wherein the at least one attribute comprises an asymmetrical ratio or an asymmetrical ratio slope.

4. The method of claim 1 wherein the at least one attribute comprises an instantaneous slope.

5. The method of claim 1 wherein the at least one attribute comprises an area enclosed by a curve of the measurement value and a selected threshold.

6. The method of claim 1 wherein the at least one attribute comprises a symmetrical area enclosed by a curve of the measurement value and a selected threshold.

7. The method of claim 1 wherein the at least one attribute comprises a peak amplitude of a change in the measurement value within the selected interval or a maximum amplitude variation in the measurement value within the selected interval.

8. The method of claim 1 wherein the at least one attribute comprises a number of times the measurement value crosses a selected threshold.

9. The method of claim 1 wherein the at least one attribute comprises a maximum positive cycle length.

10. The method of claim 1 wherein the at least one attribute comprises a minimum positive cycle length.

11. The method of claim 1 wherein the at least one attribute comprises a ratio of maximum to minimum cycle length.

12. The method of claim 1 wherein the at least one attribute comprises an average cycle peak amplitude or a longest cycle length peak amplitude or a ratio of a longest cycle length peak amplitude to an average cycle length peak amplitude.

13. The method of claim 1 wherein the at least one attribute comprises a best fit of amplitude with respect to axial position to a line.

14. The method of claim 1 wherein the at least one attribute comprises an area under a curve representing the measurement being above a first predetermined threshold is equal to one half of a total area under the curve with respect to a minimum value thereof.

15. The method of claim 1 wherein the at least one attribute comprises a standard deviation of values of the measurement within the selected axial interval.

16. The method of claim 1 wherein the at least one attribute comprises a measure of skewness of the measurement values within the selected axial interval.

17. The method of claim 1 wherein the at least one attribute comprises a ratio of cycle lengths for each of a plurality of cycles wherein the measurement value exceeds each of a plurality of predetermined threshold values.

18. The method of claim 1 wherein the at least one attribute comprises a ratio of an area between a curve of the measurement values relative to a predetermined threshold value for a top half and a bottom half of the selected axial interval.

19. The method of claim 1 wherein the at least one attribute comprises an integral of the measurement value above a threshold value with respect to position within the axial interval.

20. The method of claim 1 wherein the at least one attribute comprises a number of the measurement values between selected threshold values within the selected axial interval disposed into discrete bins compared to a number of the measurement values in the largest bin to total number of points within the selected axial interval.

21. The method of claim 1 wherein the at least one attribute is computed using a trained artificial neural network.

22. The method of claim 1 wherein the axial interval is determined in the computer by determining a length of a negative variation of the measurement value from a predetermined threshold.

23. The method of claim 1 wherein the axial interval is determined in the computer by based on the intersection of two predetermined threshold values and the well log measurement values.

24. The method of claim 1 wherein the measurements are obtained by moving a well logging instrument along the wellbore using an electrical cable or by moving a well logging instrument along the wellbore using a drill string.

25. The method of claim 1 wherein the characteristic comprises a depositional environment of formations penetrated by the wellbore.

* * * * *